United States Patent
Katwyk

(10) Patent No.: US 10,881,254 B1
(45) Date of Patent: Jan. 5, 2021

(54) APPARATUSES AND METHODS FOR PRODUCING A SHOWER TRAY

(71) Applicant: Rodney James Katwyk, Salt Lake City, UT (US)

(72) Inventor: Rodney James Katwyk, Salt Lake City, UT (US)

(73) Assignee: Rodney James Katwyk, Salt Lake City, UT (US)

( * ) Notice: Subject to any disclaimer, the term of this patent is extended or adjusted under 35 U.S.C. 154(b) by 0 days.

(21) Appl. No.: 16/289,383

(22) Filed: Feb. 28, 2019

Related U.S. Application Data

(60) Provisional application No. 62/636,751, filed on Feb. 28, 2018.

(51) Int. Cl.
*A47K 3/40* (2006.01)
*A47K 3/16* (2006.01)
*A47K 3/00* (2006.01)

(52) U.S. Cl.
CPC ............ *A47K 3/40* (2013.01); *A47K 3/1605* (2013.01); *A47K 3/008* (2013.01)

(58) Field of Classification Search
CPC ......... A47K 3/40; A47K 3/1605; A47K 3/008
USPC ............................................................. 4/613
See application file for complete search history.

(56) References Cited

U.S. PATENT DOCUMENTS

| | | | | |
|---|---|---|---|---|
| 4,541,132 A | * | 9/1985 | Long | A47K 3/40 144/360 |
| 4,587,827 A | * | 5/1986 | Wessels | B21D 22/26 72/348 |
| 5,505,070 A | * | 4/1996 | Rude | B21D 5/02 220/4.12 |
| 2017/0326615 A1 | * | 11/2017 | Roy | B21D 28/26 |

OTHER PUBLICATIONS

CNC-Multitool.com, My Styrofoam-Wolf eats its way into anything. Webpage [online][retrieved on Mar. 5, 2019], apparently published on or before Feb. 23, 2018, Retrieved from the Internet: <https://web.archive.org/web/20180223054029/www.cnc-multitool.com/ml3000f.html> (shown in attachment 1).

* cited by examiner

*Primary Examiner* — Jeremy Carroll
(74) *Attorney, Agent, or Firm* — Austin Rapp

(57) ABSTRACT

The method of producing a shower tray using a shower tray blank is disclosed. The method may comprise identifying a drain location on the shower tray blank. The method may further comprise deflecting the shower tray blank at an internal location relative to a shower tray perimeter of the shower tray blank along the depth dimension to a deflected state. The method may also comprise cutting the shower tray blank along a plane generally perpendicular to a depth dimension of the shower tray blank when the shower tray blank is in the deflected state to form the shower tray and a discarded portion. An apparatus for producing a shower tray is also disclosed.

20 Claims, 22 Drawing Sheets

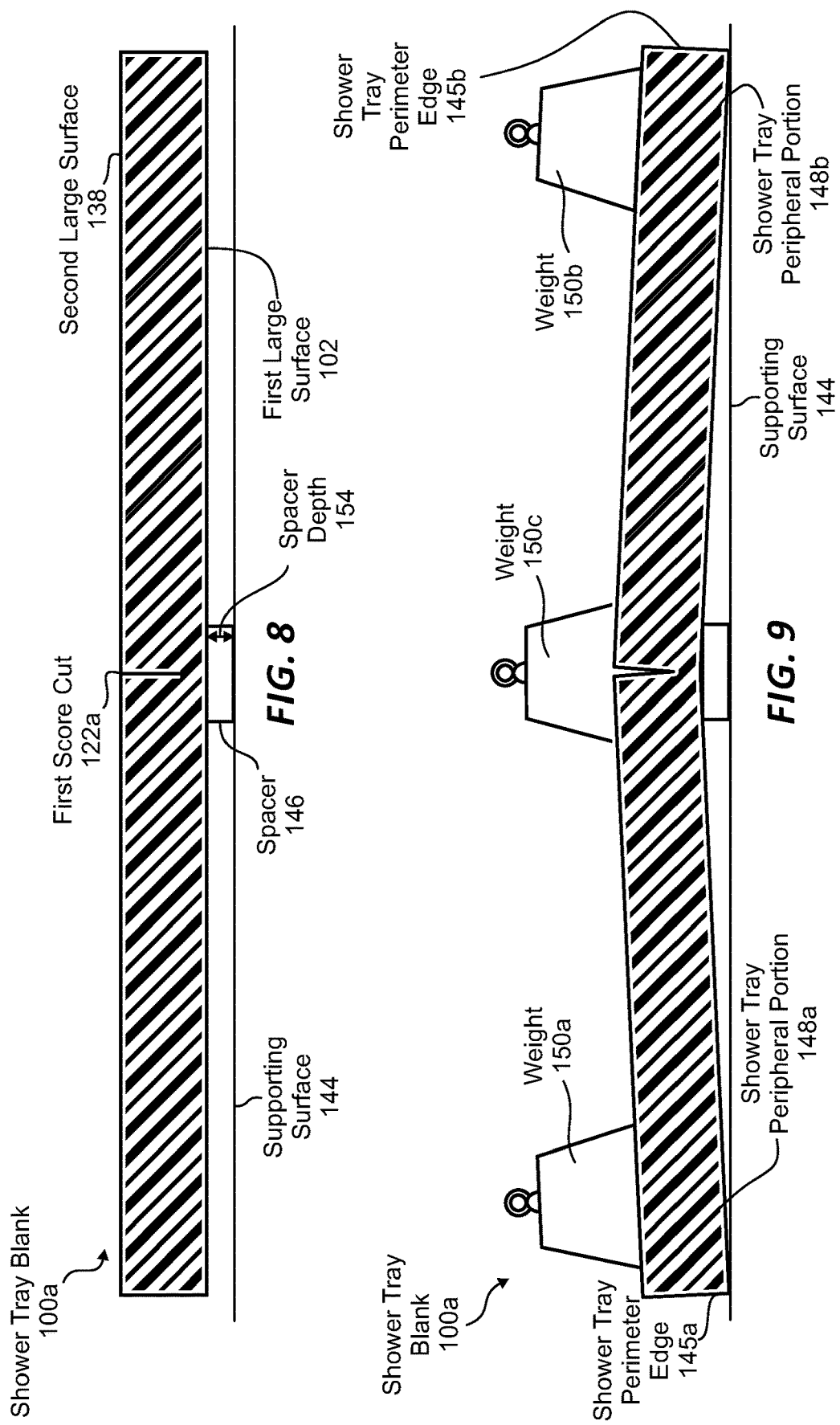

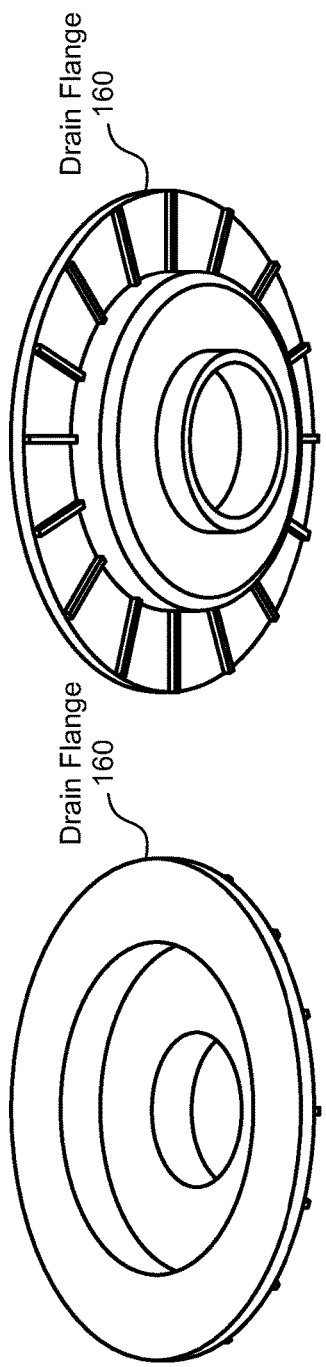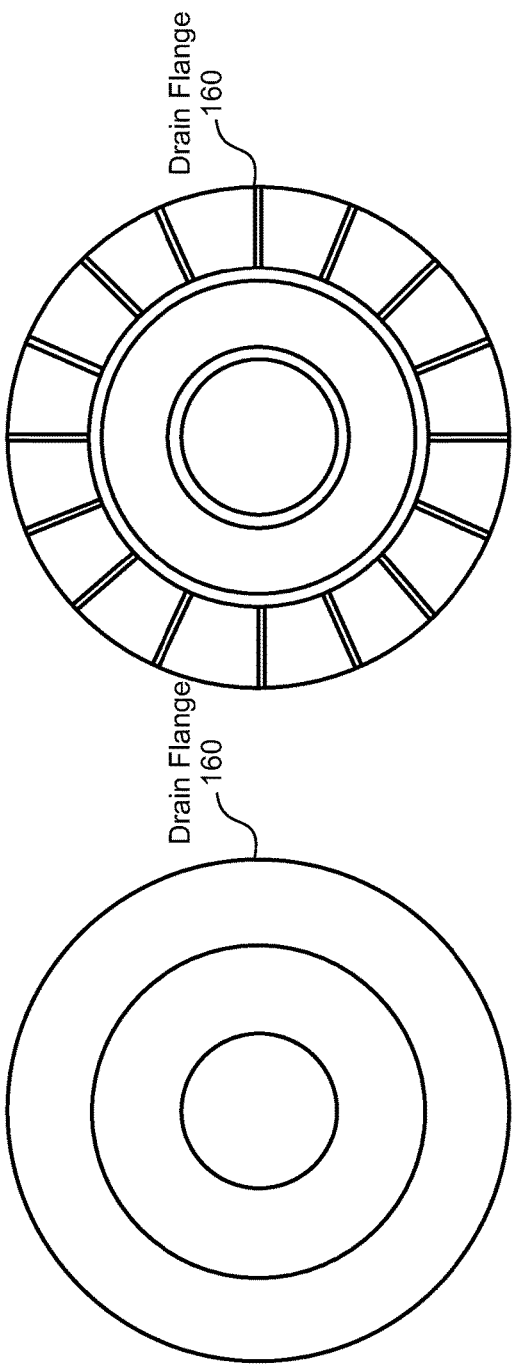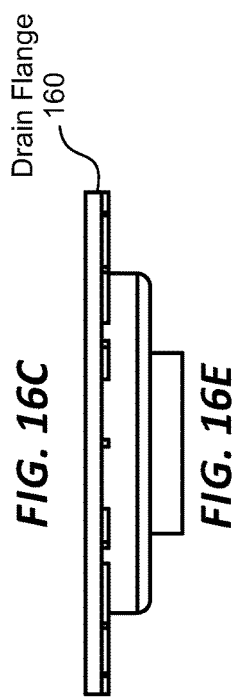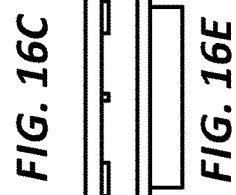

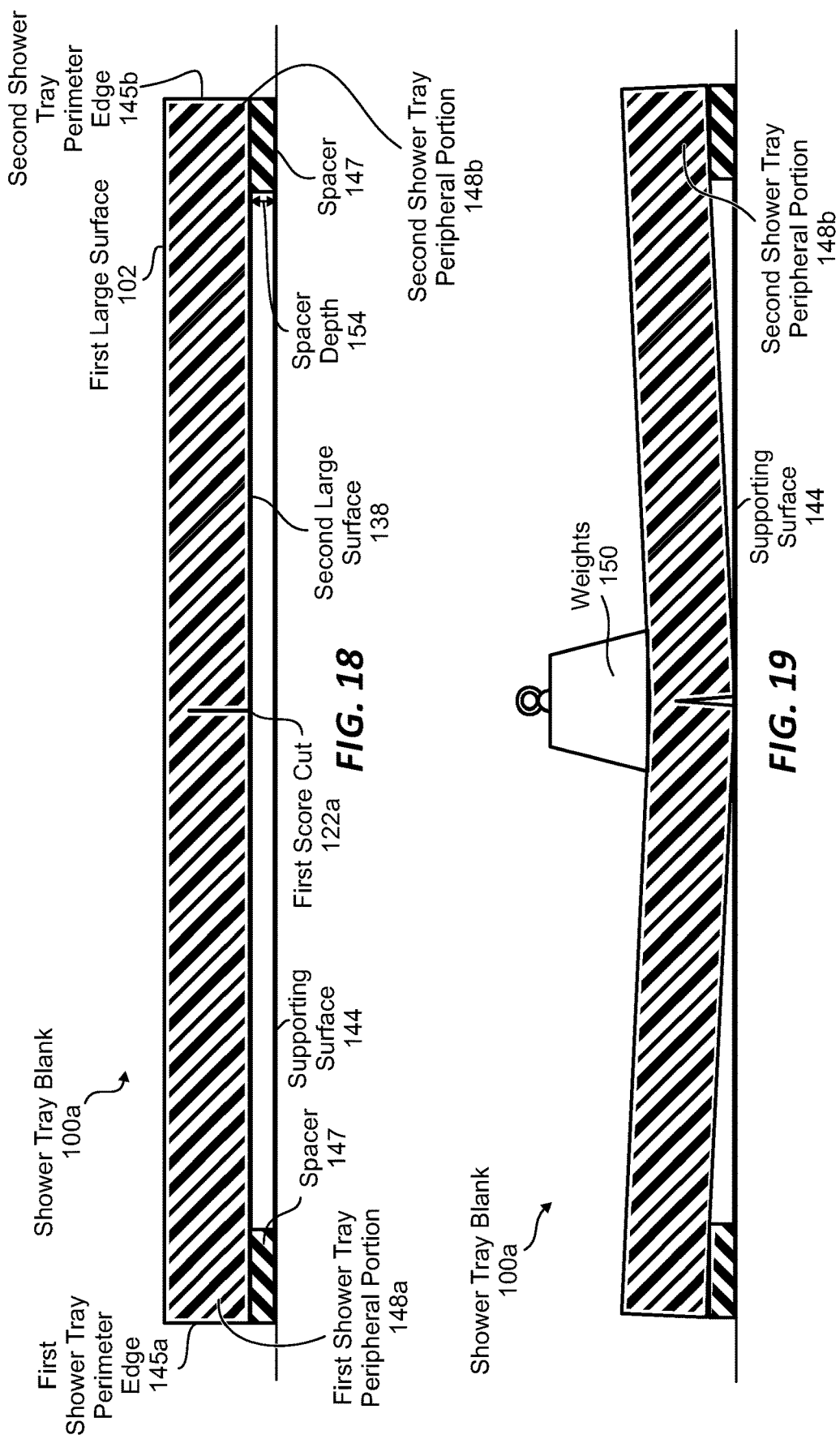

APPARATUSES AND METHODS FOR PRODUCING A SHOWER TRAY

RELATED APPLICATIONS

This application claims priority to and is a non-provisional application of U.S. App. No. 62/636,751, which was filed on Feb. 28, 2018 and is entitled Methods for Producing a Shower Tray.

TECHNICAL FIELD

The present invention relates generally to shower trays. More specifically, the present invention relates to apparatuses and methods for producing a shower tray.

BACKGROUND

Shower trays are used to create a sloped surface in a shower floor to facilitate the proper flow of water toward the drain of a shower. A shower tray may be installed on an unfinished shower floor. A drain flange may then be installed within the shower tray for connection to drain plumbing. A moisture impermeable barrier and tile may then be installed on the shower tray to finish the shower floor.

One challenge with shower trays is manufacturing a contoured surface on the shower tray that achieves a desired slope to the drain in a cost-effective manner. It may also be desirable to provide a shower tray having a substantially uniform perimeter depth. For example, the slope of the shower tray may be defined by building codes. However, the location of drains and the size and shape of a shower may vary from shower to shower.

Shower trays are manufactured using complex three-dimensional (3D) modeling software and expensive computer-controlled machinery, which often exceed $100,000 in cost. This significantly increases the cost and time needed to produce a shower tray. Accordingly, for these and other reasons, improved apparatuses and methods for producing shower trays are desirable.

SUMMARY

Embodiments of the disclosed subject matter are provided below for illustrative purposes and are in no way limiting of the claimed subject matter.

A method for producing a shower tray from a shower tray blank is disclosed. The shower tray blank may have a first large surface and a second large surface opposite the first large surface. The shower tray blank may have a length dimension, a width dimension, and a depth dimension with the length dimension, the width dimension and the depth dimension each being mutually perpendicular. The depth dimension may be generally perpendicular to the first large surface. The shower tray blank may have a depth from the first large surface to the second large surface along the depth dimension. The method may comprise identifying a drain location on the shower tray blank.

The method may further comprise scoring the shower tray blank with one or more score cuts through the first large surface or the second large surface to a depth less than the depth, the one or more score cuts passing through the drain location.

The method may also comprise deflecting the shower tray blank at the drain location relative to a shower tray perimeter of the shower tray blank along the depth dimension to a deflected state.

The method may also comprise cutting the shower tray blank along a plane generally perpendicular to the depth dimension when the shower tray blank is in the deflected state to form the shower tray and a discarded portion, the shower tray comprising either the first large surface or the second large surface and a contoured surface formed by the cut along the plane.

The method may also comprise forming a drain opening in the shower tray at the drain location.

The method may further comprise scoring the shower tray blank with a first score cut generally along the length dimension of the shower tray blank and passing through the drain location, and scoring the shower tray blank with a second score cut generally along the width dimension and passing through the drain location.

Deflecting the shower tray blank may comprise deflecting the shower tray blank at the drain location a certain distance along the depth dimension to achieve a desired slope of the contoured surface.

Deflecting the shower tray blank may comprise bending the shower tray blank such that the score cuts open when the shower tray blank is in the deflected state.

Deflecting the shower tray may comprise placing a spacer located at the drain location between the first large surface and a supporting surface, the spacer may have a spacer depth to achieve a desired slope of the contoured surface, and applying a force at locations on the second large surface to cause perimeter edges of the first large surface to contact or deflect toward the supporting surface.

Cutting the deflected shower tray blank along the plane may comprise cutting through the entire deflected shower tray blank along the plane generally perpendicular to the depth dimension, the plane being generally parallel to the supporting surface.

Deflecting the shower tray blank may comprise placing a spacer between the second large surface of the shower tray blank and a supporting surface, the spacer positioned along peripheral portions of the second large surface, the spacer may have a spacer depth to achieve a desired slope of the contoured surface, and applying a force on the first large surface at the drain location to cause the second large surface to contact or deflect toward the supporting surface.

The method may further comprise after forming the contoured surface, perimeter edges of the shower tray have a substantially uniform depth, and wherein, the contoured surface slopes down from the perimeter edges to the drain location when the shower tray is in an installed state.

The shower tray blank may comprise a polystyrene foam material.

The score cuts and the cut along the plane may be made with a hot wire cutter.

Another method for producing a shower tray from a shower tray blank is disclosed. The shower tray blank may have a first large surface and a second large surface opposite the first large surface. The shower tray blank may have a length dimension, a width dimension, and a depth dimension. The length dimension, the width dimension and the depth dimension may each be mutually perpendicular. The depth dimension may be generally perpendicular to the first large surface. The shower tray blank may have a depth from the first large surface to the second large surface along the depth dimension.

The method may comprise cutting the shower tray blank to a length and a width corresponding to determined shower length and width.

The method may also comprise identifying a drain location on the shower tray blank corresponding to a determined shower drain location.

The method may comprise scoring the shower tray blank with one or more score cuts through the second large surface or the first large surface to a depth less than the depth, the one or more score cuts passing through the drain location.

The method may comprise deflecting the shower tray blank at the drain location relative to a shower tray perimeter of the shower tray blank along the depth dimension to a deflected state.

The method may also comprise cutting the shower tray blank along a plane generally perpendicular to the depth dimension when the shower tray blank is in the deflected state to form the shower tray and a discarded portion, the shower tray comprising either the first large surface or the second large surface and a contoured surface formed by the cut along the plane.

The method may further comprise forming a drain opening in the shower tray at the drain location.

Scoring the shower tray blank may comprise scoring the shower tray blank with a first score cut generally along the length dimension of the shower tray blank and passing through the drain location, and scoring the shower tray blank with a second score cut generally along the width dimension and passing through the drain location.

Deflecting the shower tray blank may comprise deflecting the shower tray blank at the drain location a certain distance along the depth dimension to achieve a desired slope of the contoured surface.

Deflecting the shower tray blank may comprise placing a spacer located at the drain location between the first large surface and a supporting surface, the spacer having a spacer depth to achieve the desired slope of the contoured surface, and applying a force at locations on the second large surface to cause perimeter edges of the first large surface to contact or deflect toward the supporting surface.

Cutting the deflected shower tray blank along the plane may comprise cutting through the entire deflected shower tray blank along the plane, the plane being generally parallel to the supporting surface.

Another method for producing a shower tray from a shower tray blank is disclosed. The shower tray blank may have a first large surface and a second large surface opposite the first large surface. The shower tray blank may have a length dimension, a width dimension, and a depth dimension. The length dimension, the width dimension and the depth dimension may each be mutually perpendicular. The depth dimension may be generally perpendicular to the first large surface. The shower tray blank may have a depth from the first large surface to the second large surface along the depth dimension.

The method may comprise deflecting the shower tray blank at an internal location relative to a shower tray perimeter of the shower tray blank along the depth dimension to a deflected state, wherein the internal location is offset relative to the shower tray perimeter along the depth dimension and the width dimension.

The method may also comprise cutting the shower tray blank along a plane generally perpendicular to the depth dimension when the shower tray blank is in the deflected state to form the shower tray and a discarded portion, the shower tray comprising either the first large surface or the second large surface and a contoured surface formed by the cut along the plane.

The method may further comprise scoring the shower tray blank with a first score cut generally along the length dimension of the shower tray blank and passing through the drain location, and scoring the shower tray blank with a second score cut generally along the width dimension and passing through the drain location.

Deflecting the shower tray blank at the internal location may comprise deflecting the shower tray blank at the drain location a certain distance along the depth dimension to achieve a desired slope of the contoured surface.

Deflecting the shower tray blank may comprise placing a spacer located at the drain location between the first large surface and a supporting surface, the spacer having a spacer depth to achieve the desired slope of the contoured surface, and applying a force at locations on the second large surface to cause perimeter edges of the first large surface to contact or deflect toward the supporting surface.

An apparatus for producing a shower tray from a shower tray blank is also disclosed. The shower tray blank may have a first large surface and a second large surface opposite the first large surface. The shower tray blank may have a length dimension, a width dimension, and a depth dimension. The length dimension, the width dimension and the depth dimension each being mutually perpendicular. The depth dimension may be generally perpendicular to the first large surface. The shower tray blank may have a depth from the first large surface to the second large surface along the depth dimension. The apparatus may comprise a deflection apparatus for deflecting the shower tray blank at an internal location relative to a shower tray perimeter of the shower tray blank along the depth dimension to a deflected state. The apparatus may comprise a cutting apparatus for cutting the shower tray blank along a plane generally perpendicular to the depth dimension of the shower tray blank when the shower tray blank is in the deflected state to form the shower tray and a discarded portion, the shower tray comprising either the first large surface or the second large surface and a contoured surface formed by the cut along the plane.

BRIEF DESCRIPTION OF THE DRAWINGS

Various embodiments of the invention will become apparent from the following description and appended claims, taken in conjunction with the accompanying drawings. Understanding that these drawings depict only examples of the invention thereof and are, therefore, not to be considered limiting of the invention's scope, particular embodiments will be described with additional specificity and detail through use of the accompanying drawings in which:

FIG. 8 is a cross-sectional view illustrating one embodiment the shower tray blank taken across the line 8-8 of FIG. 7 in an undeflected state shown together with a spacer.

FIG. 9 is a cross-sectional view illustrating one embodiment of the spacer and the shower tray blank in a deflected state.

FIG. 16A is a top perspective view of one embodiment of a drain flange.

FIG. 16B is a bottom perspective view of the drain flange shown in FIG. 16A.

FIG. 16C is a top elevational view of the drain flange shown in FIG. 16A.

FIG. 16D is a bottom elevational view of the drain flange shown in FIG. 16A.

FIG. 16E is a side elevational view of the drain flange shown in FIG. 16A.

FIG. 18 is a cross-sectional view illustrating a shower tray blank in an undeflected state together with another embodiment of a spacer.

FIG. 19 is a cross-sectional view illustrating a shower tray blank in a deflected state shown with the embodiment of the spacer illustrated in FIG. 18.

Figure 1:
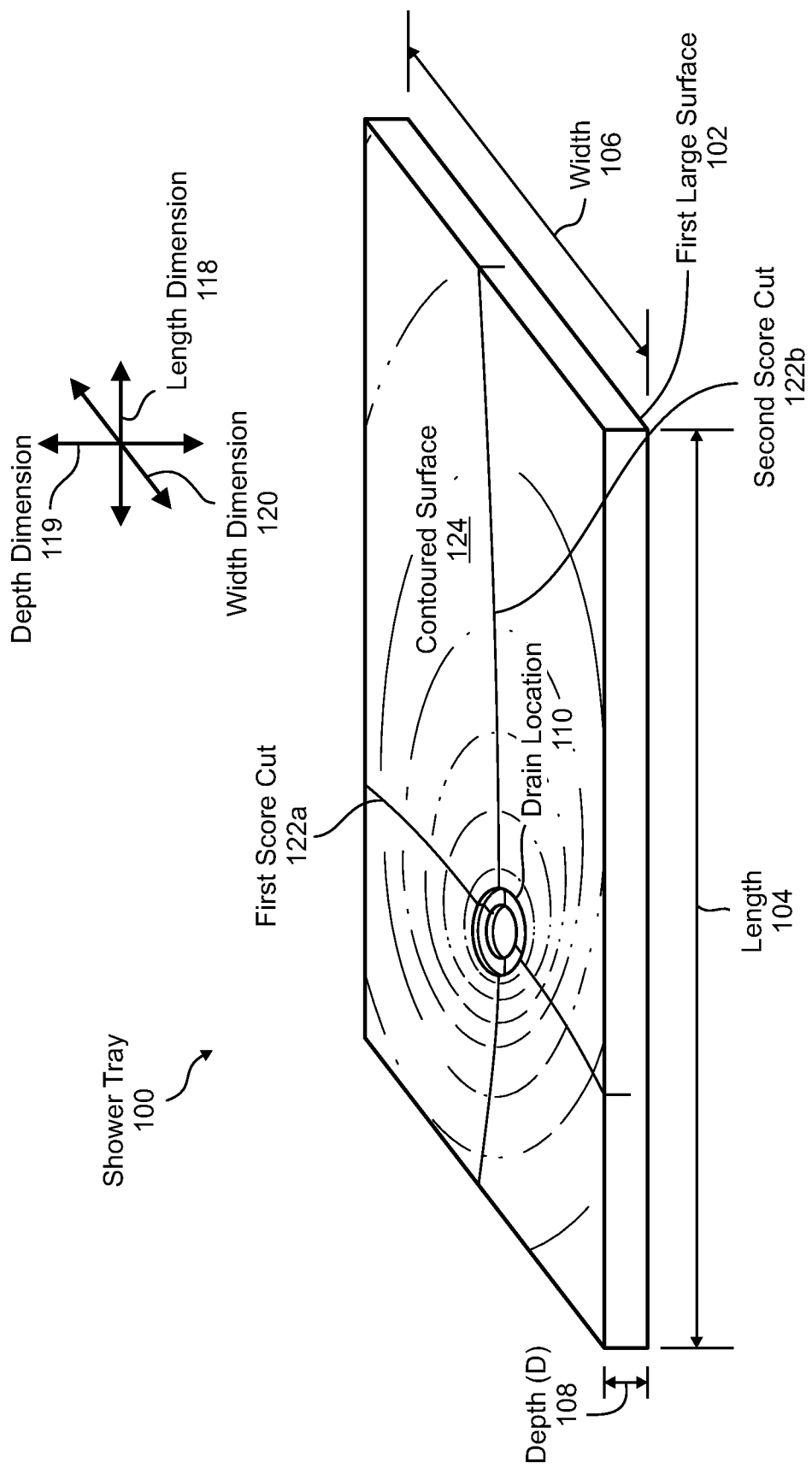
FIG. 1 is a perspective view of a shower tray, according to one embodiment of the invention.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if not specifically illustrated in the figures. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

By way of introduction, the following brief definitions are provided for various terms used in this application. As used herein, "exemplary" can indicate an example, an implementation, and/or an aspect, and should not be construed as limiting or as indicating a preference or a preferred implementation. Further, it is to be appreciated that certain ordinal terms (e.g., "first" or "second") can be provided for identification and ease of reference and may not necessarily imply physical characteristics or ordering. Therefore, as used herein, an ordinal term (e.g., "first," "second," "third") used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") can indicate "one or more" rather than "one." As used herein, a structure or operation that "comprises" or "includes" an element can include one or more other elements not explicitly recited. Thus, the terms "including," "comprising," "having," and variations thereof signify "including but not limited to" unless expressly specified otherwise. Further, an operation performed "based on" a condition or event can also be performed based on one or more other conditions or events not explicitly recited. As used in this application, the terms "an embodiment," "one embodiment," "another embodiment," or analogous language do not refer to a single variation of the disclosed subject matter; instead, this language refers to variations of the disclosed subject matter that can be applied and used with a number of different implementations of the disclosed subject matter. An enumerated listing of items does not imply that any or all of the items are mutually exclusive and/or mutually inclusive, unless expressly specified otherwise.

For this application, the phrases "connected to," "coupled to," and "in communication with" refer to any form of interaction between two or more entities, including mechanical, electrical, magnetic, electromagnetic, and thermal interaction and may also include integral formation. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanisms. The term "about" refers to items that are in direct physical contact with each other, although the items may be attached, secured, fused, or welded together. The term "integrally formed" refers to a body that is manufactured integrally (i.e., as a single piece, without requiring the assembly of multiple pieces). Multiple parts may be integrally formed with each other if they are formed from a single workpiece.

As used herein, the term "generally parallel" indicates that, in various embodiments, a particular item is within 5° of being perfectly parallel. The term "generally perpendicular" indicates that a particular item, in various embodiments, is within 5° of being perfectly perpendicular. As used herein, the term "generally along" signifies that a particular feature or component extends along a particular dimension or direction, in various embodiments, within 10° of being perfectly aligned with the particular direction or dimension. The terms "generally parallel," "generally perpendicular" and "generally along" (or grammatical variations thereof) encompass items that may vary from perfect linearity, such that these terms may encompass an item or component that has nonlinearity variation, for example, less than 0.5 of an inch of perfect linearity in various embodiments. As used herein, the term "substantially uniform" indicates that a particular value, in various embodiments, is within 0.5 inches of being precisely uniform.

In the figures, certain components may appear many times within a particular drawing. However, only certain instances of the component may be identified in the figures to avoid unnecessary repetition of reference numbers and lead lines. According to the context provided in the description while referring to the figures, reference may be made to a specific one of that particular component or multiple instances, even if the specifically referenced instance or instances of the component are not identified by a reference number and lead line in the figures.

FIG. 1 is a perspective view of a shower tray 100 according to one embodiment of the invention. For clarity, a length dimension 118, a width dimension 120 and a depth dimension 119 of the shower tray 100 are illustrated. The shower tray 100 may be manufactured from a shower tray blank. The shower tray blank may, for example, comprise a rectangular piece of material, such as polystyrene foam, from which a shower tray 100 may be manufactured. Shower tray blanks may have various shapes and are not limited to blanks that are rectangular in shape.

A shower tray 100 may be used to create a sloped floor in a shower. For example, during construction of a shower, a shower tray 100 with a contoured surface 124 may be installed on a shower floor. In some embodiments, mortar (e.g., thinset mortar) or a glue adhesive may be used to attach the shower tray 100 to the shower floor. A moisture impermeable membrane may be applied to the top of the shower tray 100 with an adhesive material (e.g., thinset mortar). A drain may be connected through an opening in the shower tray 100 and tile may then be installed on the shower tray 100 to form the sloped shower floor.

In some approaches, the contoured surface of shower trays is fabricated using complex automated fabrication. For example, a three-dimensional (3D) model of the shower tray may be generated based on the determined shower size (e.g., shower length and width) and a computer numerical control (CNC) fabrication machine (e.g., CNC router, CNC mill, etc.) which may cut the contoured shape in a stock material based on the 3D model. However, this fabrication method is expensive due to the high cost of the CNC fabrication machines, the complexity of generating the 3D model, and the time required to fabricate the shower tray. As can be seen by this discussion, methods for producing a shower tray 100 at lower costs are beneficial.

The methods described herein provide for producing a shower tray 100 that does not rely on a CNC fabrication machine, yet provide a high-quality shower tray. In some embodiments, a method for producing the shower tray 100 begins with selecting a material for the shower tray 100. In some embodiments, the material for the shower tray 100 may be expanded polystyrene or extruded polystyrene (EPS). It should be noted that other materials may be used. For example, in some embodiments, other polymer foams may be used. In other embodiments, the shower tray 100 may be fabricated from non-polymer materials (e.g., a potash composition).

The shower tray blank, from which the shower tray 100 may be manufactured, may be larger in length and width than the determined shower length and width. The depth 108 (D) of the shower tray 100 may be selected based on desired shower configurations (e.g., the requirements of the shower drain, the thickness of the tile and a desired slope of the shower floor, etc.). In some embodiments, the shower tray 100 may be an EPS block.

A perimeter of the shower tray blank may be cut to a length 104 and a width 106 on the shower tray 100 corresponding to determined shower length and width (obtained from plans of the shower, for example). The shower tray blank may be cut to fit inside the shower according to the determined shower length and width. In some embodiments, the shower may have a rectangular footprint but, of course, other shapes or configurations are possible within the scope of the disclosed subject matter. The shower tray blank may be cut to a certain length 104 and width 106 to fit within the footprint of the shower. In some embodiments, the shower tray blank may be cut using a hot wire cutter. However, it should be noted that other cutting techniques (e.g., bladed saw, cable saw, laser, mill, router, water jet, etc.) may be used to cut or score the shower tray blank.

The shower tray 100 may have a first large surface 102, which may be positioned on a shower floor in an installed state (i.e., when the shower tray 100 is installed and positioned within the shower). For example, in the installed state, the first large surface 102 may rest on the shower floor when the shower tray 100 is in an installed configuration in the shower. The shower tray 100 may also have a contoured surface 124 opposite the first large surface 102. The contoured surface 124 may be formed by a planar cut extending through the shower tray blank, which will be discussed below.

The shower tray 100 may comprise a drain location 110, which corresponds to a determined drain location in a shower in which the shower tray 100 is to be installed. The drain location 110, as illustrated in FIG. 1, may be, for example, cylindrical in shape. The shower tray, as will be discussed subsequently, may also include various score cuts, such as the first and second score cuts 122*a-b* illustrated in FIG. 1.

Figure 2:
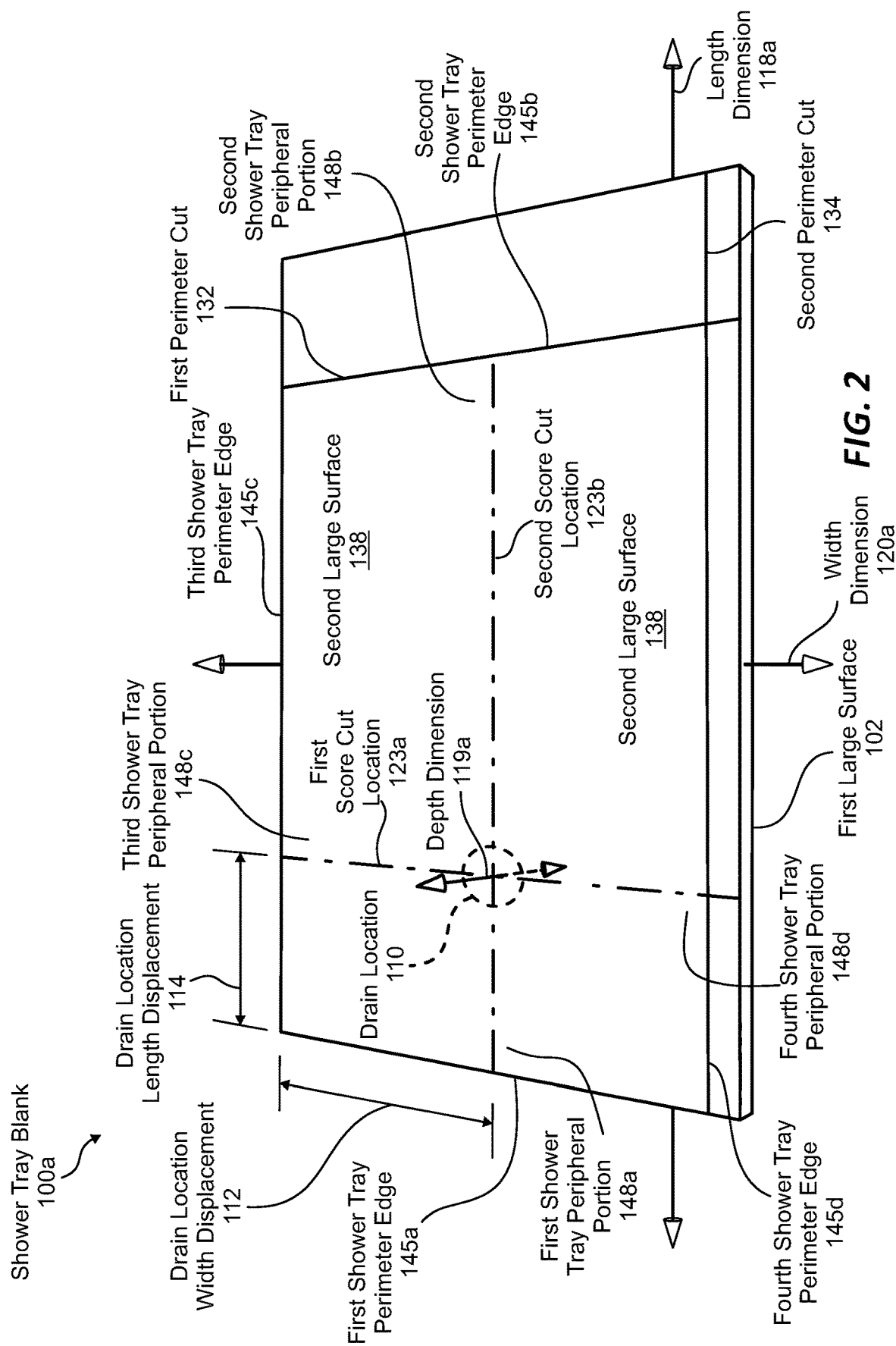
FIG. 2 illustrates one embodiment of a shower tray blank, from which a shower tray may be fabricated.
Figure 6:
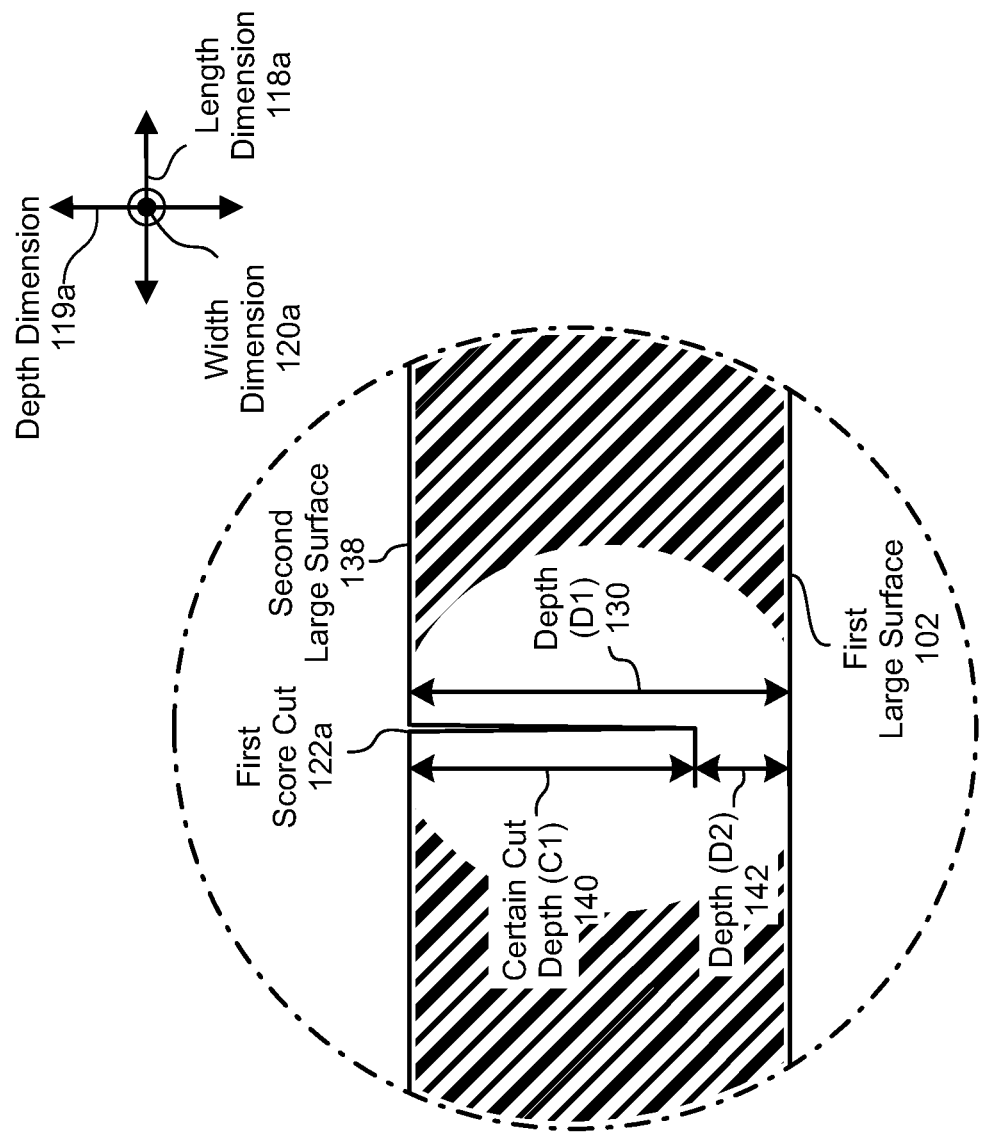
FIG. 6 is an enlarged view of region 6 of FIG. 5 illustrating a score cut on the shower tray blank.

FIG. 2 illustrates a shower tray blank 100*a*, from which a shower tray 100 may be made. As illustrated, the shower tray blank 100*a* comprises a length dimension 118*a*, a depth dimension 119*a*, and a width dimension 120*a*. Each of these dimensions 118*a*, 119*a*, 120*a* are mutually perpendicular. It should be noted, as used herein, that a length of the shower tray blank 100*a* along the length dimension 118*a* is not necessarily greater than a width of the shower tray blank 100*a* along the width dimension 120*a*. For example, a width of the shower tray blank 100*a* along the width dimension 120a may be greater than or equal to a length of the shower tray blank along the length dimension 118a. It should be noted that these dimensions 118a, 119a, 120a reflect dimensions of the shower tray blank 100a regardless of the orientation of the shower tray blank 100a with respect to the pull of gravity and regardless of whether the dimensions 118a, 119a, and 120a are depicted through dimension indicators shown on the shower tray blank 100a itself (as illustrated in FIG. 2) or through a key position to the side of the shower tray blank 100a (as illustrated in FIG. 6).

As illustrated in FIG. 2, the shower tray blank 100a comprises a first large surface 102 and a second large surface 138. As further illustrated in FIG. 2, the first large surface 102 of the shower tray blank 100a is positioned opposite the second large surface 138. The first large surface 102 and the second large surface 138 are the two largest surfaces of the shower tray blank 100a. In various embodiments, as illustrated in FIG. 2, the depth dimension 119a be generally perpendicular to the first large surface 102 and/or the second large surface 138. Although illustrated as planar, these two surfaces 102, 138 may have a non-planar shape (e.g., having slight undulations or a slightly convex or concave shape). In various embodiments, the first large surface 102 may comprise a portion of the shower tray 100, while the portion of the shower tray blank 100a comprising the second large surface 138 may be discarded during the process of manufacturing the shower tray 100. (This portion may be referred to as a "discarded portion.") Also, please note that because, for example, of the score cuts 122a-b, the discarded portion may comprise one or more separate and discrete portions of the shower tray blank 100a. Alternatively, the second large surface 138 may comprise a portion of the shower tray 100, while the first large surface 102 may comprise a part of the discarded portion. As used herein, the discarded portion comprises the portion of the shower tray blank 100a that is not incorporated into the shower tray 100. In various embodiments, the discarded portion may be later utilized to form another shower tray or another product. Also, the discarded portion may be retained with the shower tray 100 to provide protection to the shower tray 100 during shipment and installation of the shower tray 100.

FIG. 2 further illustrates perimeter cuts 132, 134 in the shower tray blank 100a that may be used to specify a length 104 and a width 106 of the shower tray 100 in accordance with determined shower length and width. In this example, a first perimeter cut 132 extends generally along the width dimension 120a of the shower tray blank 100a. A second perimeter cut 134 extends generally along the length dimension 118a of the shower tray blank 100a.

A drain location 110 may be identified (e.g., determined or marked on the shower tray blank 100a) on the shower tray blank 100a and corresponds to a determined drain location in the shower in which the shower tray 100 will be installed. In various embodiments, the drain location 110 is a cylindrical region corresponding to the determined drain location in the shower and thus may be illustrated on the shower tray 100 and the shower tray blank 100a. In some embodiments, a central point (e.g., a central axis) of the drain location 110 on the shower tray 100 may be positioned at a drain location width displacement 112 along the width dimension 120a from a first perimeter edge (e.g., a perimeter edge of the shower tray blank 100a or the shower tray 100) and a drain location length displacement 114 along the length dimension 118 from a second perimeter edge (e.g., a perimeter edge of the shower tray blank 100a or the shower tray 100). Using the drain location width displacement 112 and the drain location length displacement 114 together with the size and shape of the drain in the pertinent shower, the drain location 110 on the shower tray 100 and/or shower tray blank 100a may be identified.

The shower tray blank 100a may be scored in multiple locations. In some embodiments, the shower tray blank 100a may have score cuts 122a-b (illustrated in FIG. 1) at first and second score cut locations 123a-b. In other embodiments, the shower tray 100 may have more or less than two score cuts 122a-b. The score cut locations 123a-b (as well as the score cuts 122a-b at those locations 123a-b) may be centered at and pass through the drain location 110 of the shower tray 100. In one embodiment, the shower tray blank 100a is devoid of any score cuts 122a-b. The number, orientation, and position of score cuts 122a-b implemented in connection with a shower tray blank 100a may be varied within the scope of the disclosed subject matter, as will be further illustrated and discussed in connection with FIG. 22.

As illustrated in FIG. 2, the shower tray blank 100a includes a first shower tray perimeter edge 145a, a second shower tray perimeter edge 145b opposite the first shower tray perimeter edge 145a, a third shower tray perimeter edge 145c between the first shower tray perimeter edge 145a and the second shower tray perimeter edge 145b along the length dimension 118a, and a fourth shower tray perimeter edge 145d opposite the third shower tray perimeter edge 145c. Accordingly, the shower tray perimeter 145a-d of the shower tray blank 100a may comprise four shower tray perimeter edges 145a-d. The shower tray blank 100a further includes a first shower tray peripheral portion 148a adjacent to the first shower tray perimeter edge 145a, a second shower tray peripheral portion 148b adjacent to the second shower tray perimeter edge 145b, a third shower tray peripheral portion 148c adjacent to the third shower tray perimeter edge 145c, and a fourth shower tray peripheral portion 148d adjacent to the fourth shower tray perimeter edge 145d. For clarity, it should be noted that the shower tray perimeter edges 145a-d and the shower tray peripheral portions 148a-d are present in and may be discussed both with reference to the shower tray 100 and the shower tray blank 100a (irrespective of whether excess material 136a-b—illustrated in FIG. 3—and/or a discarded portion 153—illustrated FIGS. 10 and 21—have been removed from the shower tray blank 100a).

Figure 3:
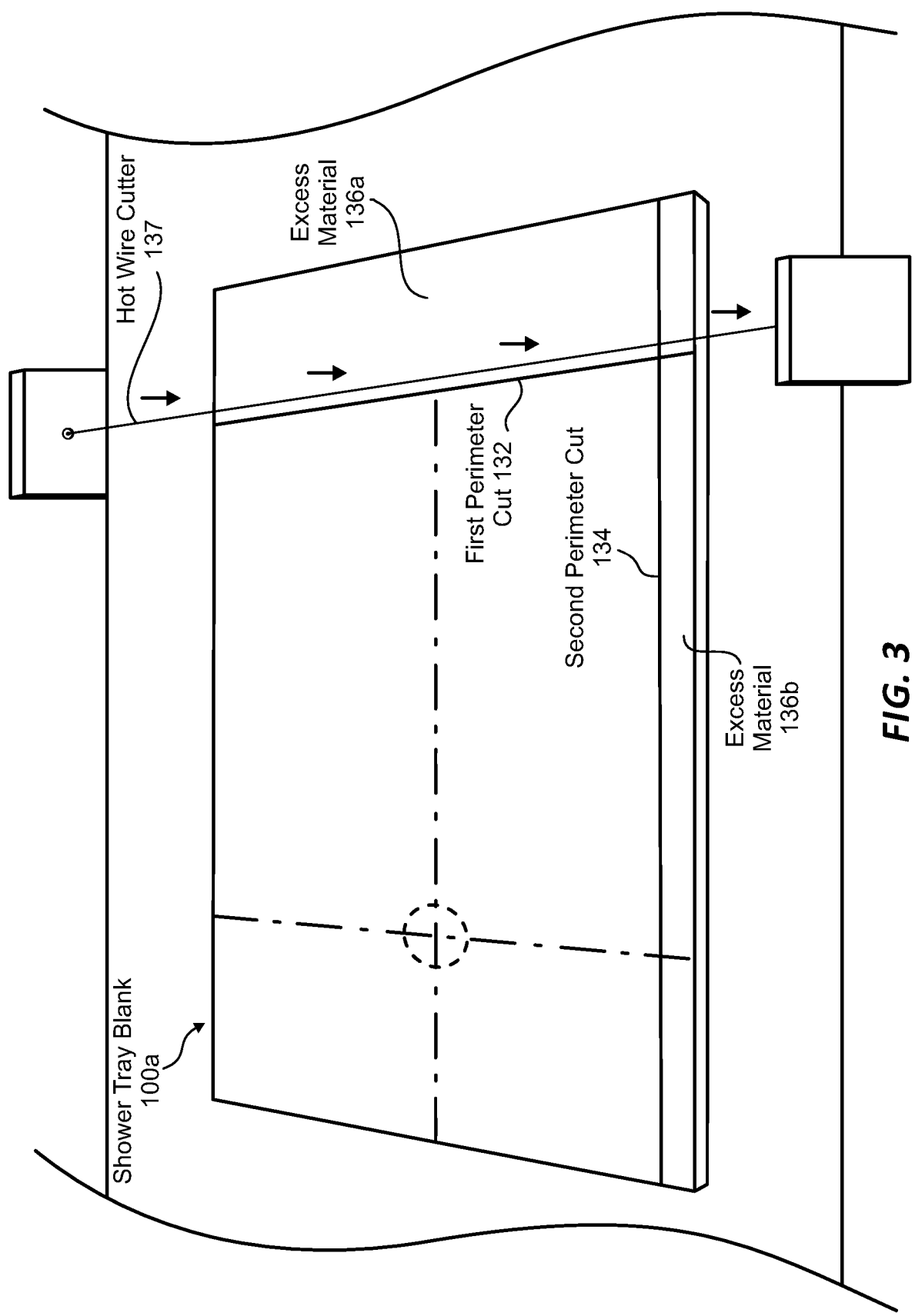
FIG. 3 is a top perspective view illustrating one embodiment of cutting a shower tray perimeter of the shower tray blank.

FIG. 3 illustrates one example of cutting the shower blank 100a to a desired length 104 and width 106. In this example, a hot wire cutter 137 cuts through the shower tray blank 100a at the first perimeter cut 132. The hot wire cutter 137 or the shower tray blank 100a may be repositioned, and the hot wire cutter 137 may cut through the shower tray blank 100a at the second perimeter cut 134. Of course, a second hot wire cutter at another cutting station or at the same cutting station may be employed to make the second perimeter cut 134. After cutting the shower tray blank 100a, the excess material 136a-b may be discarded or recycled. Upon cutting, the shower tray blank 100a may now have a length 104 and width 106 conforming to determined shower length and width. As noted previously, different apparatuses or methods for cutting the shower tray blank 100a may be employed, such as a saw or laser cutter. The shower dimensions may be determined, for example, by measuring the pertinent shower or using architectural plans for the shower.

Figure 4:
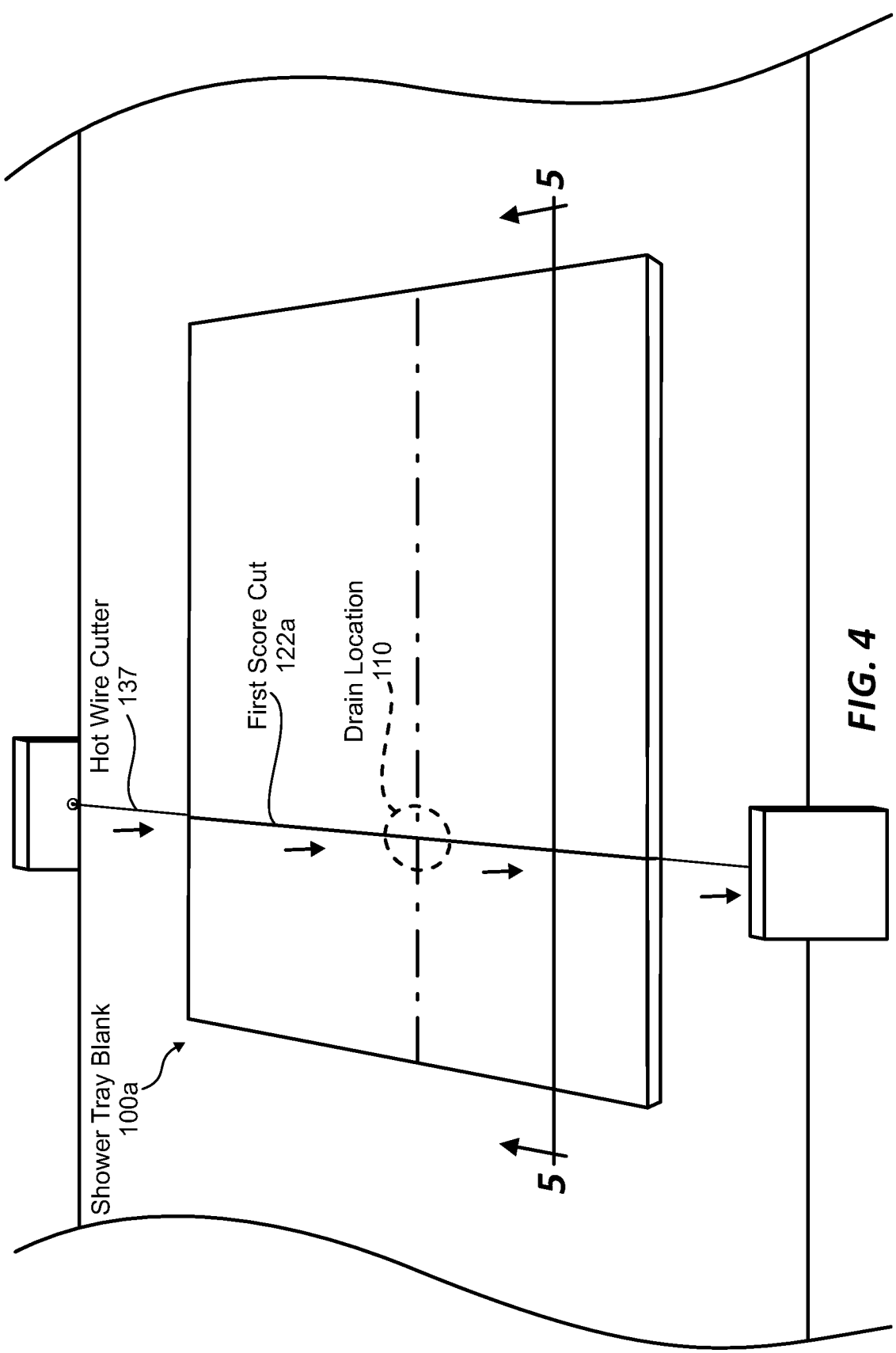
FIG. 4 is a top perspective view illustrating one embodiment of scoring the shower tray blank using a hot wire cutter.
Figure 5:
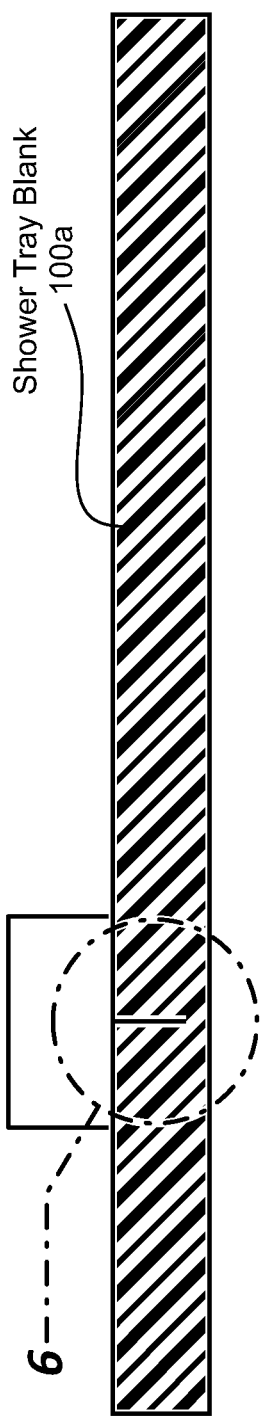
FIG. 5 is a cross-sectional view illustrating one embodiment of scoring the shower tray blank using a hot wire cutter taken across the line 5-5 of FIG. 4.

As illustrated in FIGS. 4-7, the score cuts 122a-b may extend through the second large surface 138 generally along the depth dimension 119a to a certain cut depth (C1) 140 without cutting through the shower tray blank 100a to the first large surface 102 (i.e., each score cut 122a-b is less than the depth (D1) 130 of the shower tray blank 100a by a margin of the depth (D2) 142). Therefore, the score cuts 122*a-b* may leave an amount of material having a depth (D2) 142 still connected. FIGS. 4-6 illustrate scoring the shower tray 100 using a hot wire cutter 137. The hot wire cutter 137 may cut through the shower tray 100 down to the cut depth (C1) 140. The hot wire cutter 137 may cut the first score cut 122*a* (generally along the depth dimension 119*a*, generally along the width dimension 120*a*, and generally perpendicular to the length dimension 118*a*) at the first score cut location 123*a* centered at and passing through the drain location 110 of the shower tray blank 100*a*, as illustrated in FIGS. 4-6. The hot wire cutter 137 may then be raised back up through the shower tray blank 100*a* leaving the material adjacent to the first large surface 102 still attached.

Figure 7:
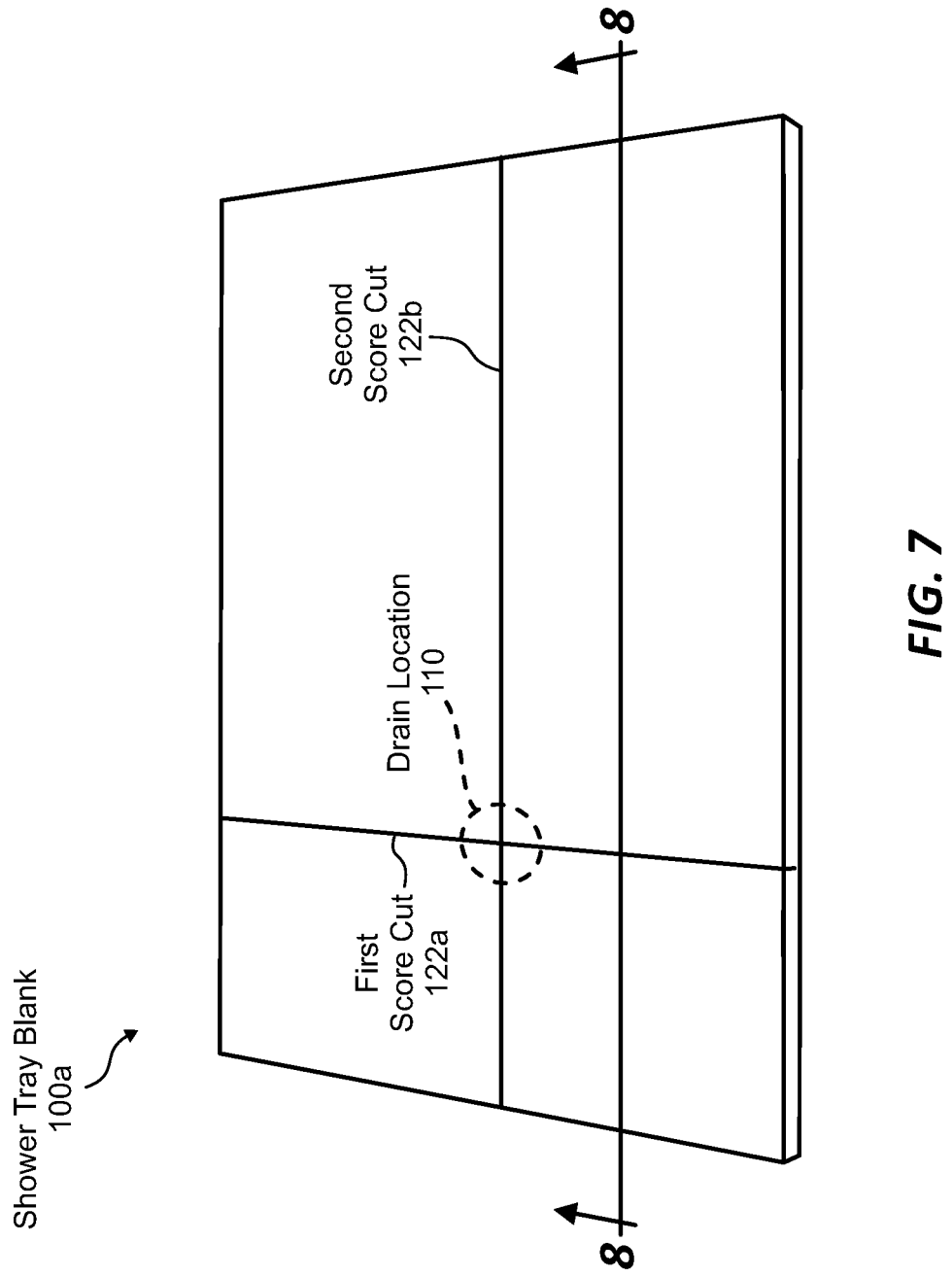
FIG. 7 is a top perspective view illustrating one embodiment of a scored shower tray blank.

The hot wire cutter 137 may also cut the second score cut 122*b* (generally along the depth dimension 119*a*, generally perpendicular to the width dimension 120*a*, and generally along the length dimension 118*a*) at the second score cut location 123*b* centered and passing through at the drain location 110 of the shower tray blank 100*a*, which is not illustrated in FIGS. 4-6 but would follow analogous procedures as those employed in connection with forming the second score cut 122*b*. A similar procedure may be performed to make additional score cuts, if desired. FIG. 7 illustrates two completed score cuts 122*a-b* in the shower tray blank 100*a* with each of the score cuts 122*a-b* centered at and passing through the drain location 110.

Upon scoring the shower tray blank 100*a*, the shower tray blank 100*a* may be deflected in preparation for forming the contoured surface 124. In an alternative embodiment, the shower tray blank 100*a* may be deflected without the use of score cuts 122*a-b*. The deflection may be centered at the drain location 110. In other words, the shower tray blank 100*a* may be deflected by applying a force, for example, to the drain location 110 generally along the depth dimension 119*a* and applying a generally opposite force (also generally along the depth dimension 119*a*). By way of example only, a first force may be exerted on the first large surface 102 at the drain location 110 or another internal location relative to the perimeter edges on the shower tray blank 100*a*. (As used herein, the term "internal location" signifies a location offset from the shower tray perimeter 145*a-d* along the length and width dimensions 118*a*, 120*a*.) One or more forces (e.g., weights) may be applied to the second large surface 138 generally opposite the first force. In this way, the score cuts 122*a-b* on the second large surface 138 may be forced open and the shower tray blank 100*a* may flex with respect to the drain location 110 in a deflected state. In this deflected state, the score cuts 122*a-b* may open.

The amount of deflection may be based on a desired slope of the shower tray 100. In some embodiments, the shower tray 100 may be deflected a certain distance to achieve a slope of the contoured surface based on building codes. In many areas, building codes require a slope of 0.25 inches per foot (approximately, a 2% slope), which is approximately ¼ inch rise per foot of run. However, it should be noted that other slopes may be obtained by using different deflection distances.

In some embodiments, the amount of deflection may be determined based on the longest distance from the drain location 110 to a perimeter edge. Using this length, a deflection distance may be determined that will produce the desired slope.

The shower tray blank 100*a* may be deflected using a number of different techniques. One technique is illustrated in FIGS. 8-11, which show section views of the shower tray blank 100*a*. In this approach, a spacer 146 is located at the drain location 110 between the first large surface 102 and a supporting surface 144, as illustrated in FIG. 8. In some embodiments, the spacer 146 may be a circular disk having a certain spacer depth 154 corresponding to the deflection distance. The spacer depth 154 of the spacer 146 may be selected to achieve the desired slope of the contoured surface 124. As noted previously the second large surface 138 of the shower tray blank 100*a* is positioned opposite the first large surface 102.

Figure 10:
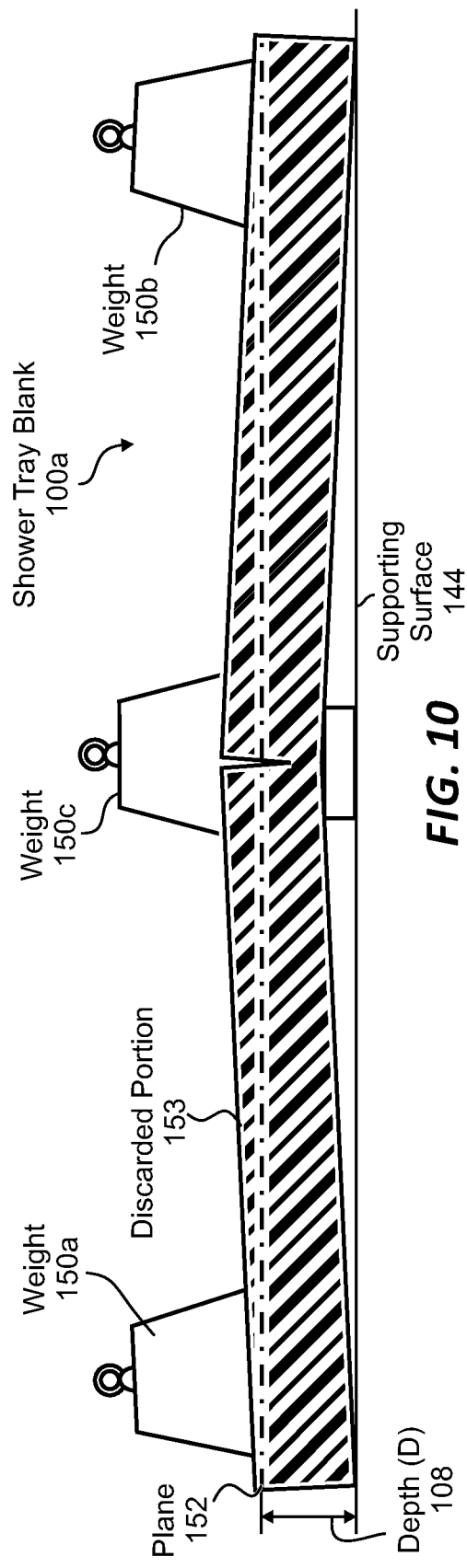
FIG. 10 is a cross-sectional view illustrating one embodiment of cutting the shower tray blank along a plane in a deflected state.

As illustrated in FIG. 9, a number of weights 150*a-c* may be placed at locations on the second large surface 138 to cause perimeter edges 145*a-b* of the shower tray blank 100*a* to deflect toward or contact the supporting surface 144. For example, one weight 150*a-c* may be placed on each of the four peripheral portions 148*a-b* adjacent to four perimeter edges 145*a-b* to force the four perimeter edges 145*a-b* to contact or deflect toward the supporting surface 144. (Please note that only three weights 150*a-c* are illustrated in FIGS. 9 and 10 because these figures are cross-sectional views, but four weights 150*a-d* may be used.) Once the weights 150*a-c* are applied, the score cuts 122*a-b* may open up and the shower tray blank 100*a* may bend in the area at and surrounding the spacer 146.

As illustrated in FIG. 10, the deflected shower tray 100 may be cut along a plane 152 offset by the depth (D) 108 from the first large surface 102 along the depth dimension 119*a*. In particular, the shower tray 100 may be cut through the entire deflected shower tray along a plane 152 located at a depth (D) 108 from the first large surface 102 along the depth dimension 119*a* (measured along a shower tray perimeter edge 145*a-d*). The plane 152 may be generally parallel to the supporting surface 144. The supporting surface 144 comprises the work surface upon which the deflection and then cutting are performed. Of course, the supporting surface 144 may be planar, as illustrated, or nonplanar (e.g., a number of support members or beams). The supporting surface 144 may not necessarily be orthogonal (i.e., perpendicular) with respect to the gravitational pull of the earth. For example, deflection on the supporting surface 144 could occur generally perpendicular to the gravitational pull using, for example, a rectangular frame to apply a force to peripheral portions 148*a-b* of the shower tray blank 100*a* adjacent to perimeter edges 145*a-b* of the shower tray blank 100*a* on the second large surface 138 and a spacer secured to the supporting surface 144. The depth dimension 119*a*, length dimension 118*a*, and width dimension 120*a*, as illustrated in the figures, retain their orientation with respect to the shower tray blank 100*a* regardless of the orientation of the shower tray blank 100*a* with respect to the gravitational pull of the earth.

In some embodiments, the cut along the plane 152 may be made with a hot wire cutter 137. Of course, other methods of cutting along the plane 152 may be employed, such as a saw or laser cutter. The cut along the plane 152 may extend through the entirety of the shower tray blank 100*a* material. For example, the hot wire cutter 137 may be positioned at a certain position along the depth dimension 119*a* at one side of the shower tray 100. The hot wire cutter 137 may then cut through the shower tray 100 to the other side of the shower tray 100.

Figure 11:
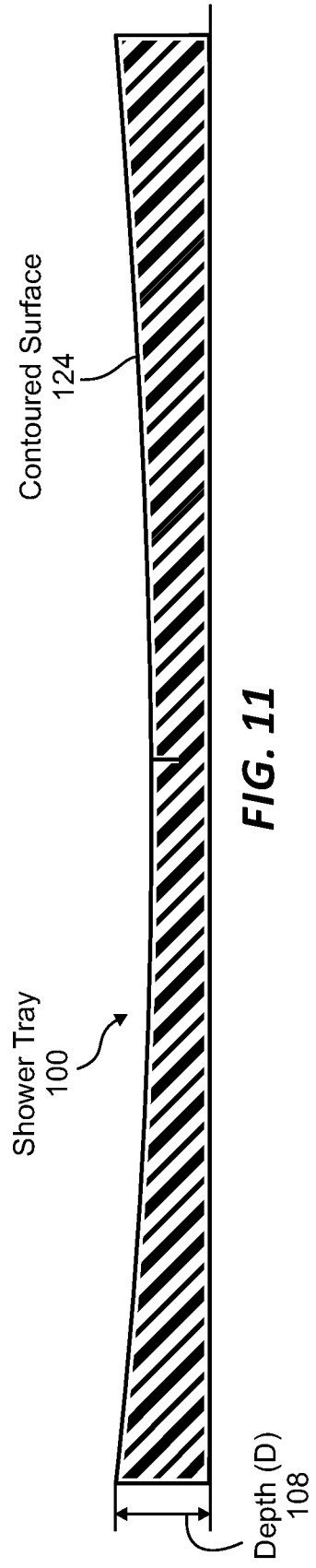
FIG. 11 is a cross-sectional view illustrating one embodiment of the contoured surface of a shower tray in an undeflected state.

The cut along the plane 152 may form the contoured surface 124 opposite the first large surface 102 when the shower tray 100 is in an undeflected state. In other words, when the weights 150*a-c* are removed from the shower tray blank 100*a* (as illustrated in FIG. 11), the shower tray 100 may return back to its original state (i.e., the undeflected state). When the shower tray 100 bends back to its undeflected state, the surface created by cutting along the plane 152 may be referred to as the contoured surface 124, as illustrated in FIG. 11.

It should be noted that after forming the contoured surface 124, the perimeter edges 145a-b of the shower tray 100 may have substantially uniform depth so long as the plane 152 is generally parallel to the supporting surface 144. In other words, the perimeter edges 145a-b may have substantially the same depth (D) 108. In various embodiments, the depth (D) 108 of the perimeter edges 145a-b may be, for example, substantially two inches, substantially 0.75 inches (for so-called "zero-entry" showers in which there is no lip or ledge at the entry of the shower) or substantially four inches. The uniformity of the depth for (D) 108 has been difficult to achieve without using complex and expensive CNC machines. Thus, the apparatuses and methods provide a much more cost-effective alternative to achieve uniformity of the depth of the perimeter edges 145a-b. The contoured surface 124 may slope down from the perimeter edges 145a-b to the drain location 110.

The cut along the plane 152 thus forms (in other words, separates the shower tray blank 100a) into a discarded portion 153 and a shower tray 100. The discarded portion 153 may be used for various purposes, such as for forming another shower tray, for other purposes, or may simply be discarded. It should also be noted here that the term "shower tray blank" refers to a portion of material from which a "shower tray" may be manufactured. Thus, the term "shower tray blank" applies to an unfinished product, which may comprise excess material 136a-b, if any, and discarded material 153. The term "shower tray" refers to a shower tray blank from which excess material 136a-b and discarded material 153 have been removed and in which a contoured surface 124 has been formed, irrespective of whether a drain opening has been cut into the shower tray.

It should also be noted that in lieu of weights 150 a-c a frame (which may comprise two or more elongate members, such as metal or wood beams, or rods) may be utilized, such as a rectangular frame to apply the force applied by the weights 150 a-c to the shower tray blank 100a on the second large surface 138 illustrated in FIGS. 8-11.

One alternative method for deflecting and cutting the shower tray blank 100a is illustrated in FIGS. 18-21 and will be discussed in connection with those figures.

Figure 12:
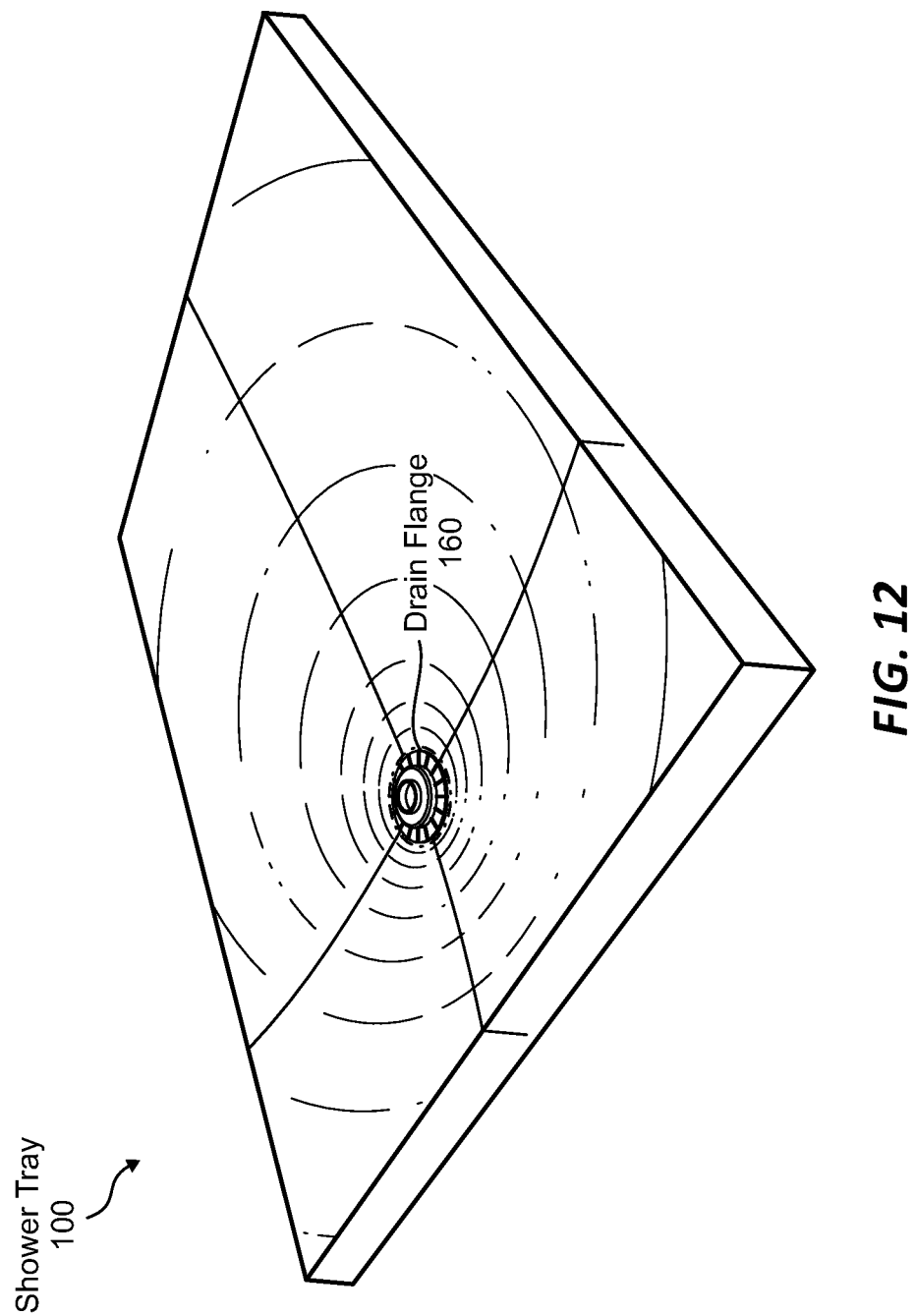
FIG. 12 is a perspective view illustrating one embodiment of a drain flange positioned on the shower tray for tracing an outline of the drain flange.
Figure 13:
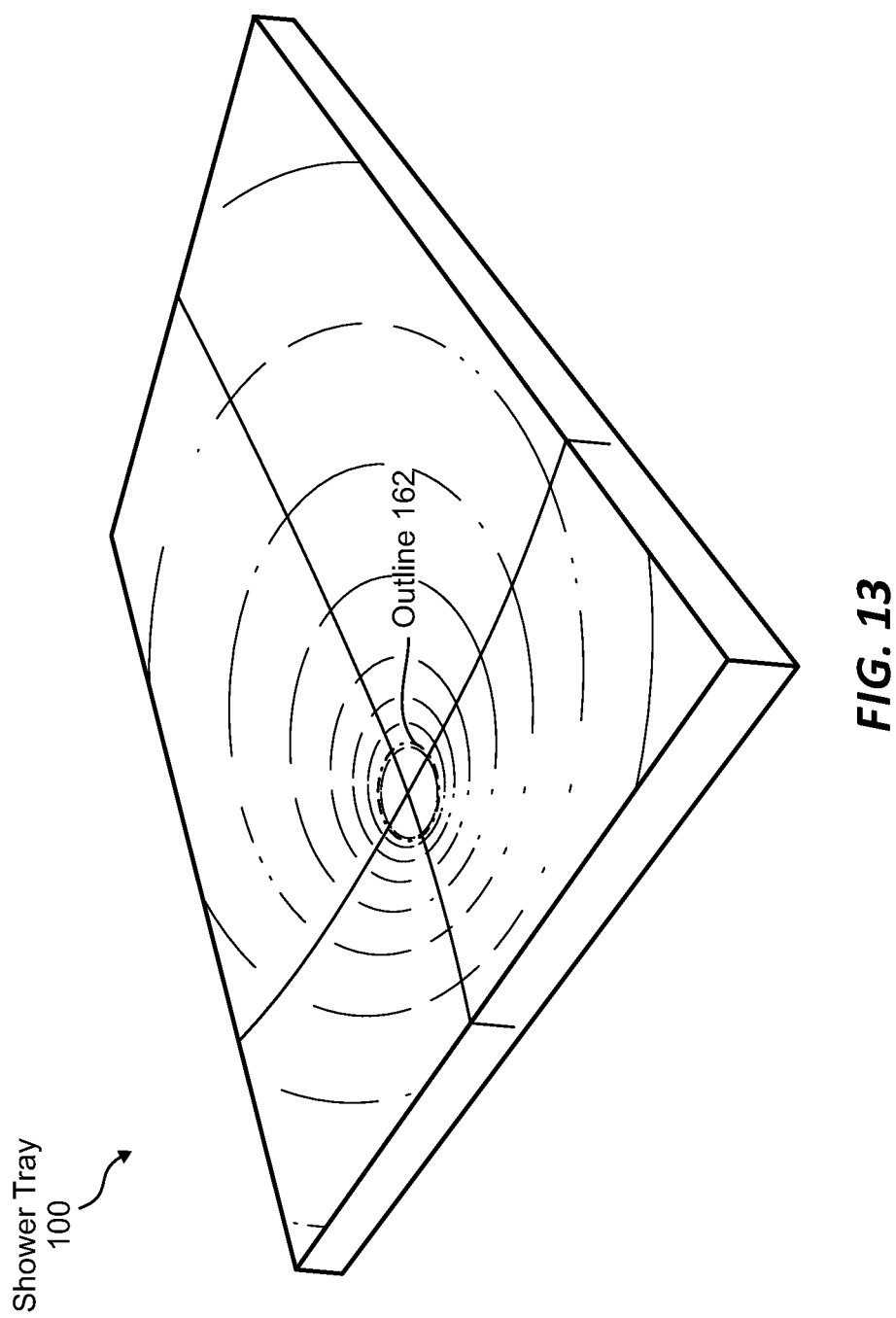
FIG. 13 is a perspective view illustrating one embodiment of an outline of the drain flange positioned on the shower tray.
Figure 14:
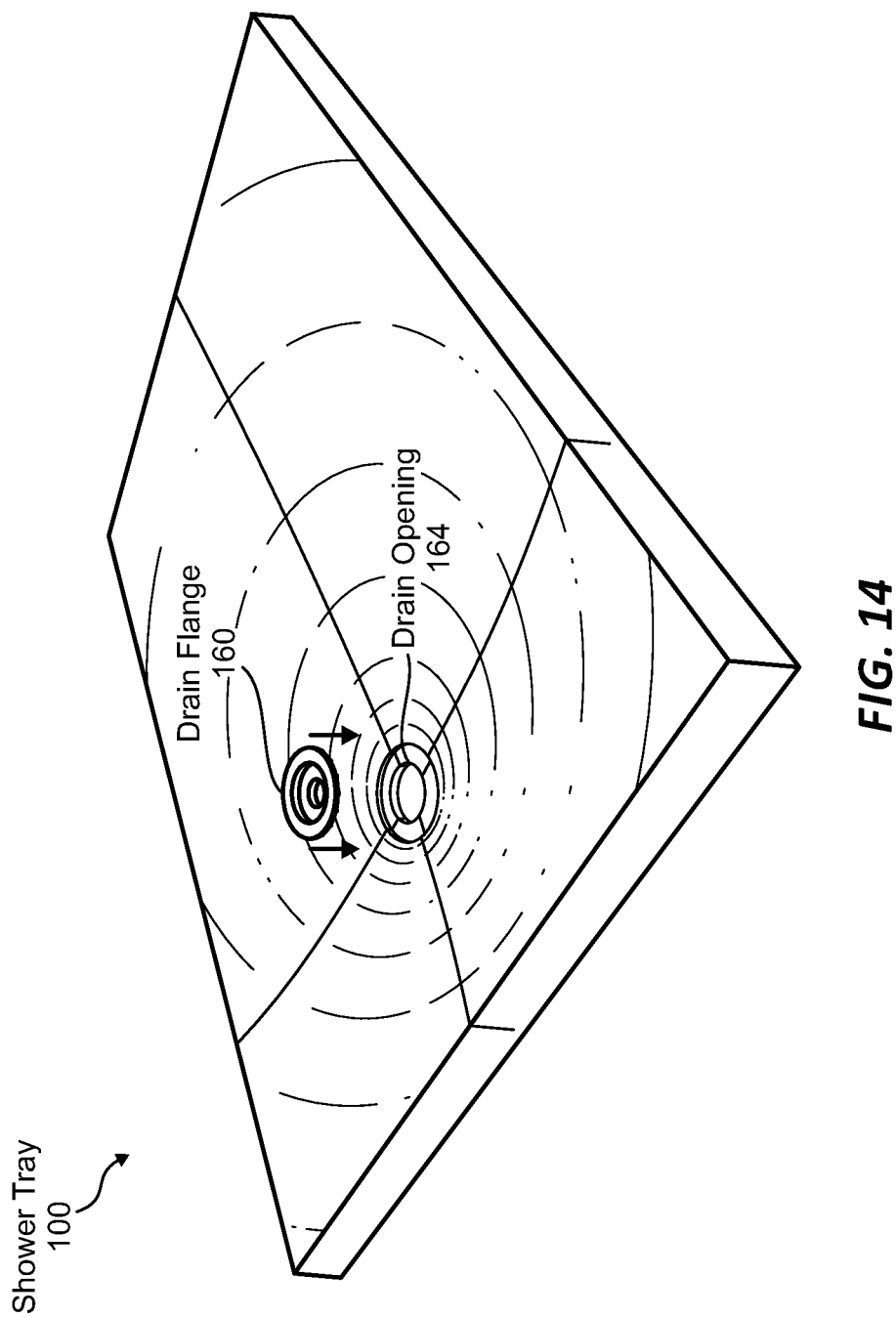
FIG. 14 is a perspective view illustrating one embodiment of a drain opening formed to accommodate the drain flange on the shower tray with a drain flange positioned above the opening.
Figure 15B:
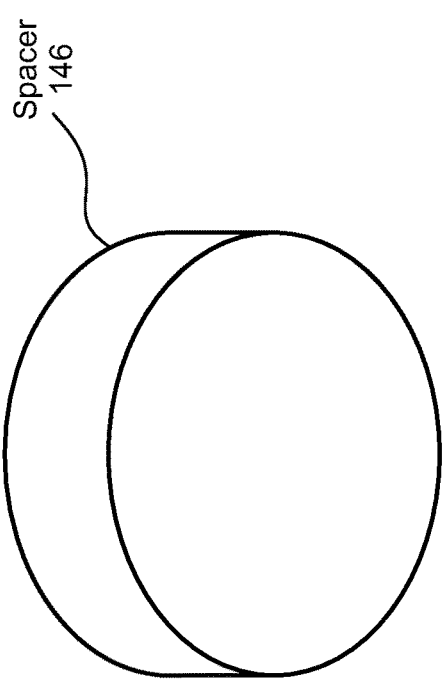
FIG. 15B is a bottom perspective view of the spacer shown in FIG. 15A.
Figure 15D:
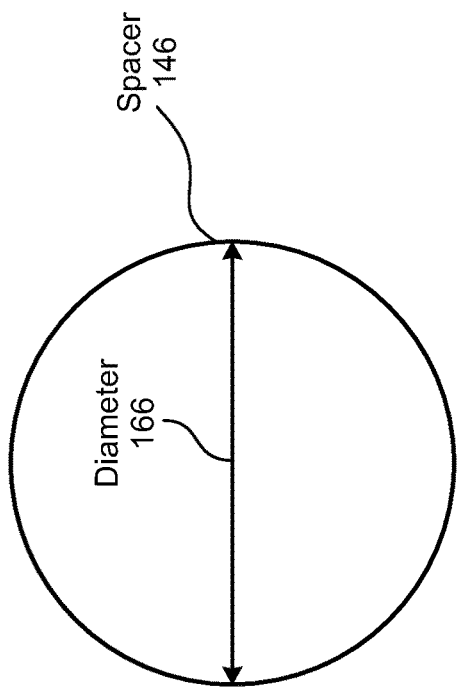
FIG. 15D is a top view of the spacer shown in FIG. 15A.
Figure 15A:
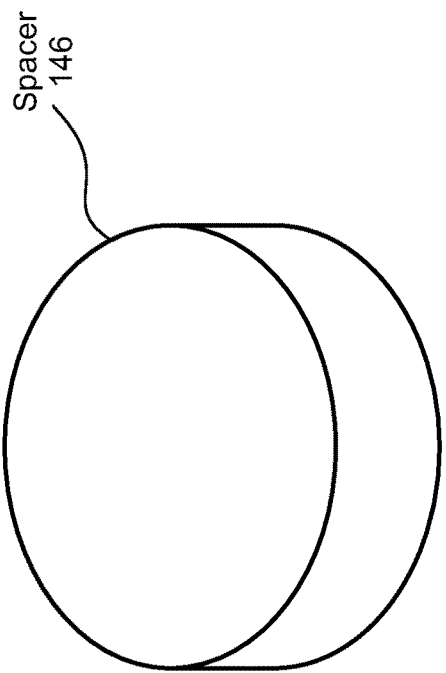
FIG. 15A is a top perspective view of one embodiment of a spacer.
Figure 15C:
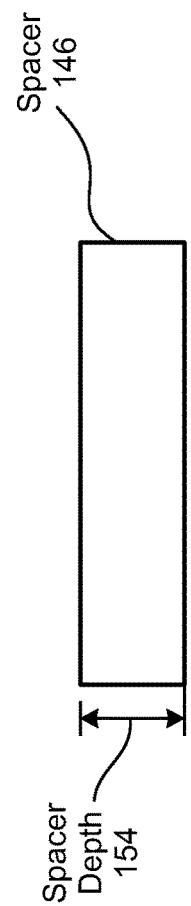
FIG. 15C is a side view of the spacer shown in FIG. 15A.

A drain opening 164 may be formed in the shower tray 100 at the drain location 110, as illustrated in FIGS. 12-14. For example, a drain flange 160 for the shower drain or a template of the drain flange may be placed on the contoured surface 124 at the drain location 110. An outline 162 of the drain may be traced on the contoured surface 124, as illustrated in FIGS. 12-13.

The shower tray 100 may be cut along the outline 162 forming the drain opening 164, as illustrated in FIG. 14. In some embodiments, the drain opening 164 may have different shapes to accommodate the drain flange 160 of the shower. For example, the drain opening 164 may be contoured, beveled, stepped, etc. (as also illustrated in FIG. 14) based on the installed configuration of the drain flange. In various embodiments, a number of different types of drain flanges 160 have the same external shape that may be received by the drain opening 164 such that the drain opening 164 may be cut and shaped to receive a number of different types of drain flanges 160.

Once the drain opening 164 is formed, the shower tray 100 may be ready to be positioned in a shower in the installed configuration. In some embodiments, the shower tray 100 may be coated with fiberglass or another coating to increase its strength to accommodate greater weights.

FIGS. 15A-15D illustrate one embodiment of a spacer 146 used to deflect the shower tray blank 100a. The spacer 146 may have a cylindrical shape with a diameter 166. The spacer 146 may have a spacer depth 154 sized to achieve the desired slope of the contoured surface 124. It should be noted that the spacer 146 may have different shapes. For example, the spacer 146 may be an oval prism, rectangular prism, square prism, cube, etc.

FIGS. 16A-16C illustrate one embodiment of a drain flange 160 that may be used in an installed configuration of the shower tray 100. The drain opening 164 of the shower tray 100 may be sized and positioned to accommodate the drain flange 160 in the installed configuration.

Figure 17A:
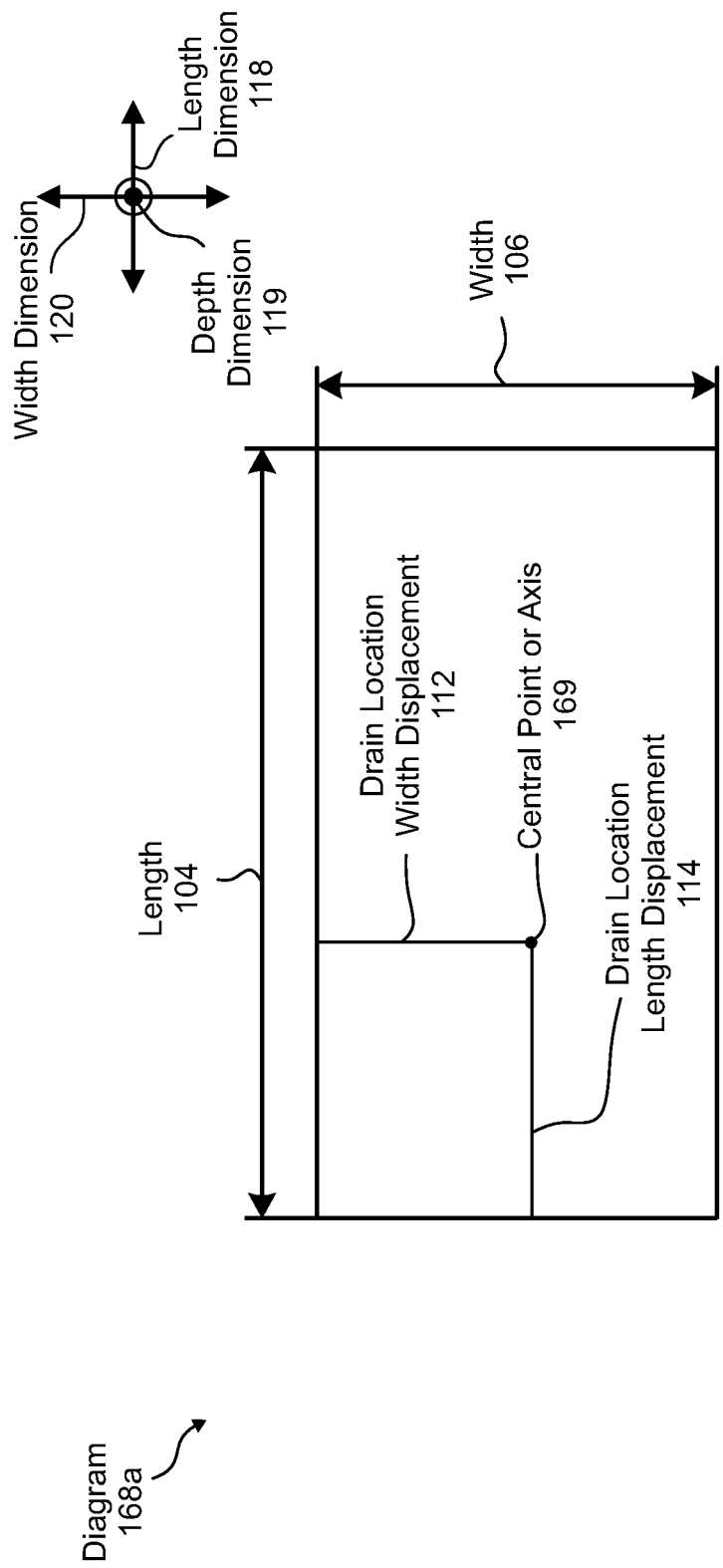
FIG. 17A-B illustrate first and second plans or diagrams which may be utilized to fabricate a shower tray.
Figure 17B:
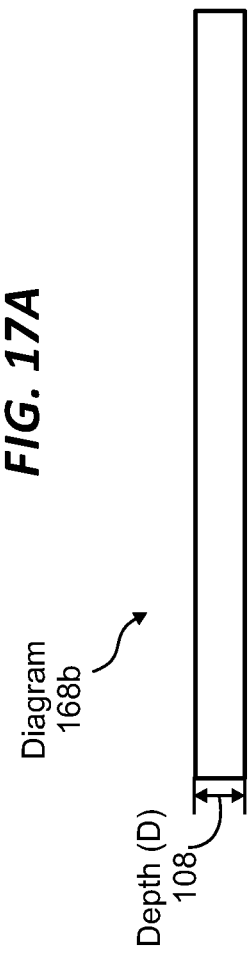

FIGS. 17A-17B illustrate a first and second diagram 168a-b from which a shower tray 100 may be fabricated. The information included in the diagrams 168a-b may be provided verbally or in writing, for example, by a tile contractor. The diagrams 168a-b may be utilized by a tray fabricator to ascertain, for example, the size of the unfinished shower floor and the location of the drain on the shower floor for purposes of manufacturing the shower tray 100. The first diagram 168a illustrates a length 104 generally along the length dimension 118 of the shower tray 100 and a width 106 generally along the width dimension 120. The first diagram 168a also illustrates a drain location width displacement 112 generally along width dimension 120 from a first perimeter edge and a drain location length displacement 114 along the length dimension 118 from a second perimeter edge to identify, for example, a central point or axis 169 of a drain opening 164.

The second diagram 168b may be utilized to illustrate a depth (D) 108 of the shower tray 100. The depth (D) 108 represents, after the contoured surface 124 is formed, a maximum depth of the shower tray 100. In one embodiment, a perimeter of the shower tray (i.e., the shower tray perimeter 145a-d) is of substantially uniform depth (D). As used herein, the term "substantially uniform," signifies that, in various embodiments, a particular item is uniform within +/−0.1, 0.25, or 0.5 inches of being precisely uniform.

FIGS. 18-21 illustrate another method for deflecting a shower tray blank 100a and making a cut across the shower tray blank 100a at plane 152. As illustrated in FIG. 18, a spacer 147 may be placed intermediate the shower tray peripheral portions 148a-d (only a first and second peripheral shower tray portions 148a-b, which are adjacent to the first and second shower tray perimeter edges 145a-b are labeled in FIG. 18) and a supporting surface 144. The spacer 147 may have a spacer depth 154 to achieve a desired slope of the contoured surface 124 of the shower tray 100 being fabricated. In the embodiment illustrated in FIGS. 18-21, the spacer 147 may comprise, for example, a rectangular frame (i.e., a frame having an open central portion) positioned intermediate the second large surface 138 and the supporting surface 144. Alternatively, the spacer 147 could, for example, comprise a set of bars, beams, or interconnected weights to apply a desired pressure to peripheral portions 148a-d of the shower tray blank 100a. In the illustrated method, the first large surface 102 base faces away from the supporting surface 144.

In this approach, as illustrated in FIG. 19, a weight 150 may be placed on the first large surface 102 (now oriented upwards) at the drain location 110 to cause the second large surface 138 to contact or at least deflect toward the supporting surface 144. In other words, in this approach, the interior of the shower tray 100 is free to deflect toward the supporting surface 144, and the perimeter edges 145a-b and peripheral portions 148a-d are constrained by the spacer 147.

Figure 20:
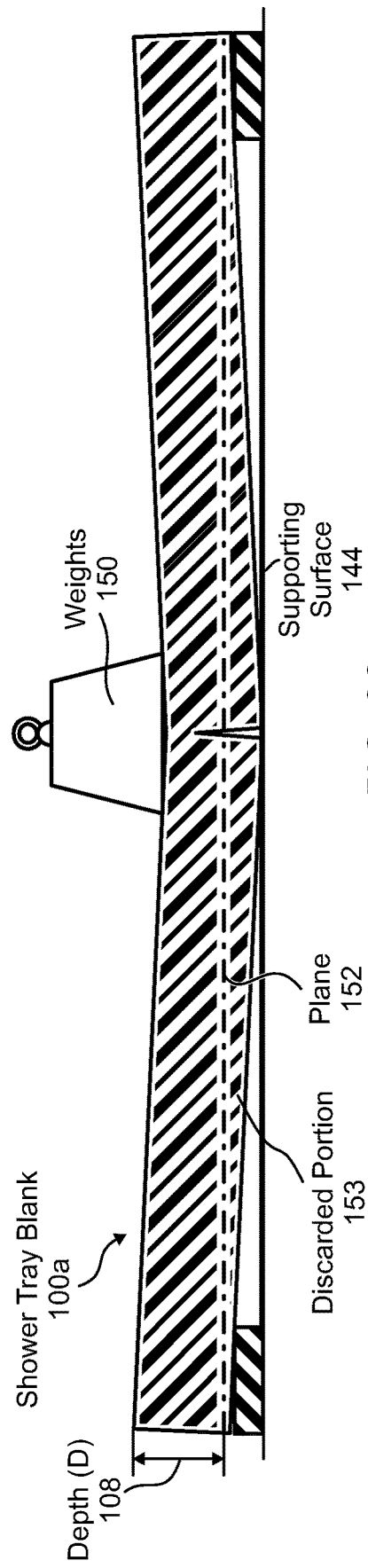
FIG. 20 is a cross-sectional view illustrating a cut along a plane in a shower tray blank.
Figure 21:
FIG. 21 is a cross-sectional view illustrating one embodiment of a shower tray in an undeflected state.

As illustrated in FIG. 20, a cut may be created in the deflected shower tray blank 100a along the plane 152 offset a depth (D) 108 from first large surface 102 along the shower tray perimeter edge 145a-d to form the contoured surface 124 opposite the first large surface 102 when the shower tray 100 is in an undeflected state, as illustrated in FIG. 21.

Once the contoured surface 124 is formed by cutting through the shower tray blank 100a along the plane 152, the discarded material 153 (labeled in FIG. 20) may be discarded, recycled, or used for another purpose (such as for making another shower tray if the discarded portion 153 is sufficiently large). The discarded portion 153 is not part of the finished shower tray 100 and may be discarded.

Figure 22:
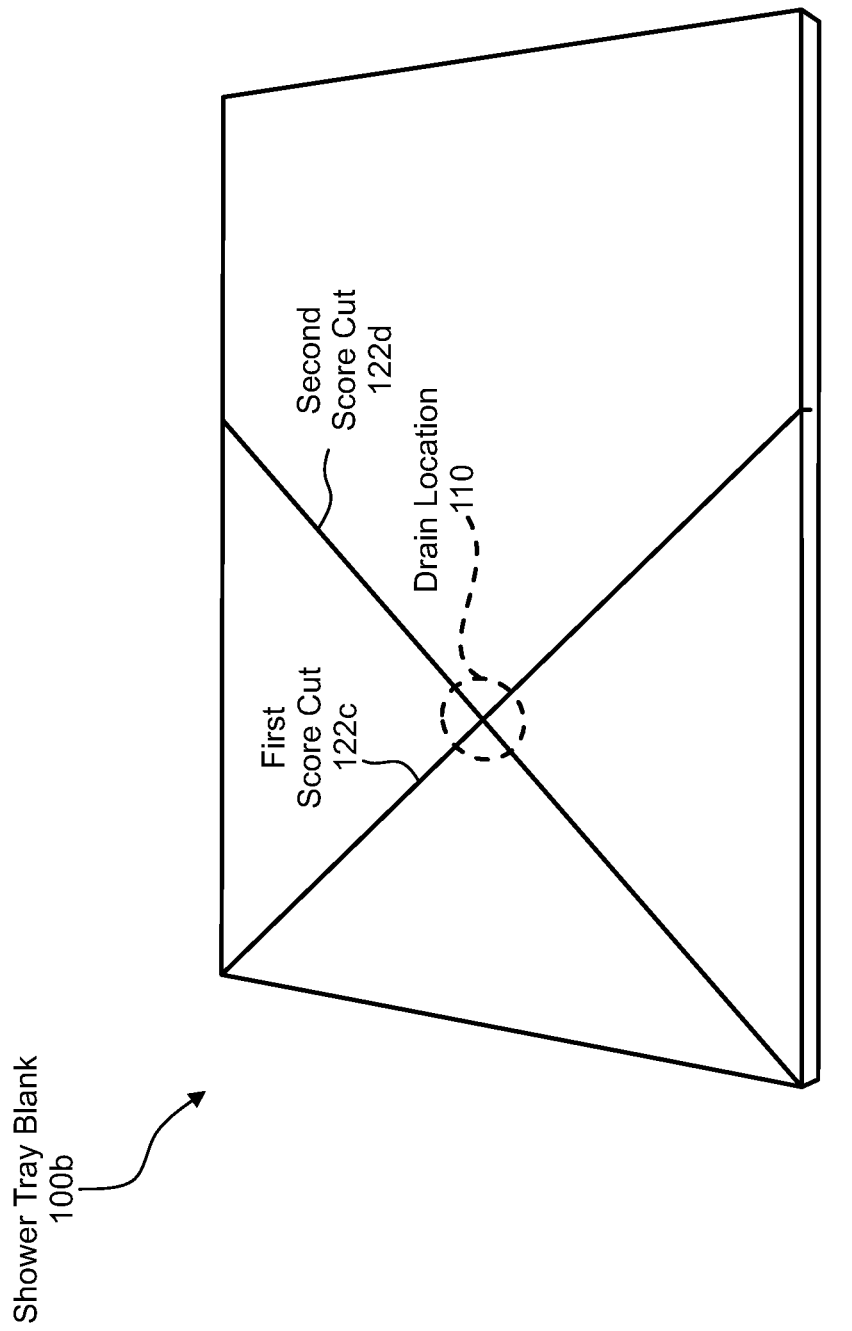
FIG. 22 is an elevated perspective view showing one embodiment of the shower tray blank including alternative embodiments of score cuts.

FIG. 22 illustrates another embodiment of a shower tray blank 100b. The illustrated embodiment of the shower tray blank 100b is similar to the previously disclosed embodiment of the shower tray blank 100a with the exception of positioning of the first and second score cuts 122c, 122d at a different orientation while still passing through and being centered at the drain location 110. As indicated previously, the score cuts 122a-d for the shower tray blank 100a-b may be varied in orientation, position, and number or may be omitted entirely in various embodiments.

As used herein, the term "deflection apparatus" comprises an apparatus for deflecting the shower tray blank 100a-b. For example, a deflection apparatus may comprise a spacer 146, 147, weights 150a-c utilized on a supporting surface 144 to deflect a shower tray blank 100a-b as illustrated, for example, in connection with FIGS. 8-10 and FIGS. 18-19. In one embodiment, a frame, a set of beams or rods, or other mechanism may be implemented to apply a force to cause deflection of the shower tray blank 100a together with a force applying mechanism (e.g., weights 150a-d or a set of one or more clamps), as illustrated below in connection with FIGS. 23-25. The deflection force applied to the shower tray blank 100a may, for example, comprise electric, hydraulic, or manual force. As used herein the term "a cutting apparatus" may comprise, for example, a hot wire cutter, laser cutter, saw, or other cutting device for cutting the shower tray blank 100a along a plane 152 when the shower tray blank 100a-b is in a deflected state.

Figure 23:
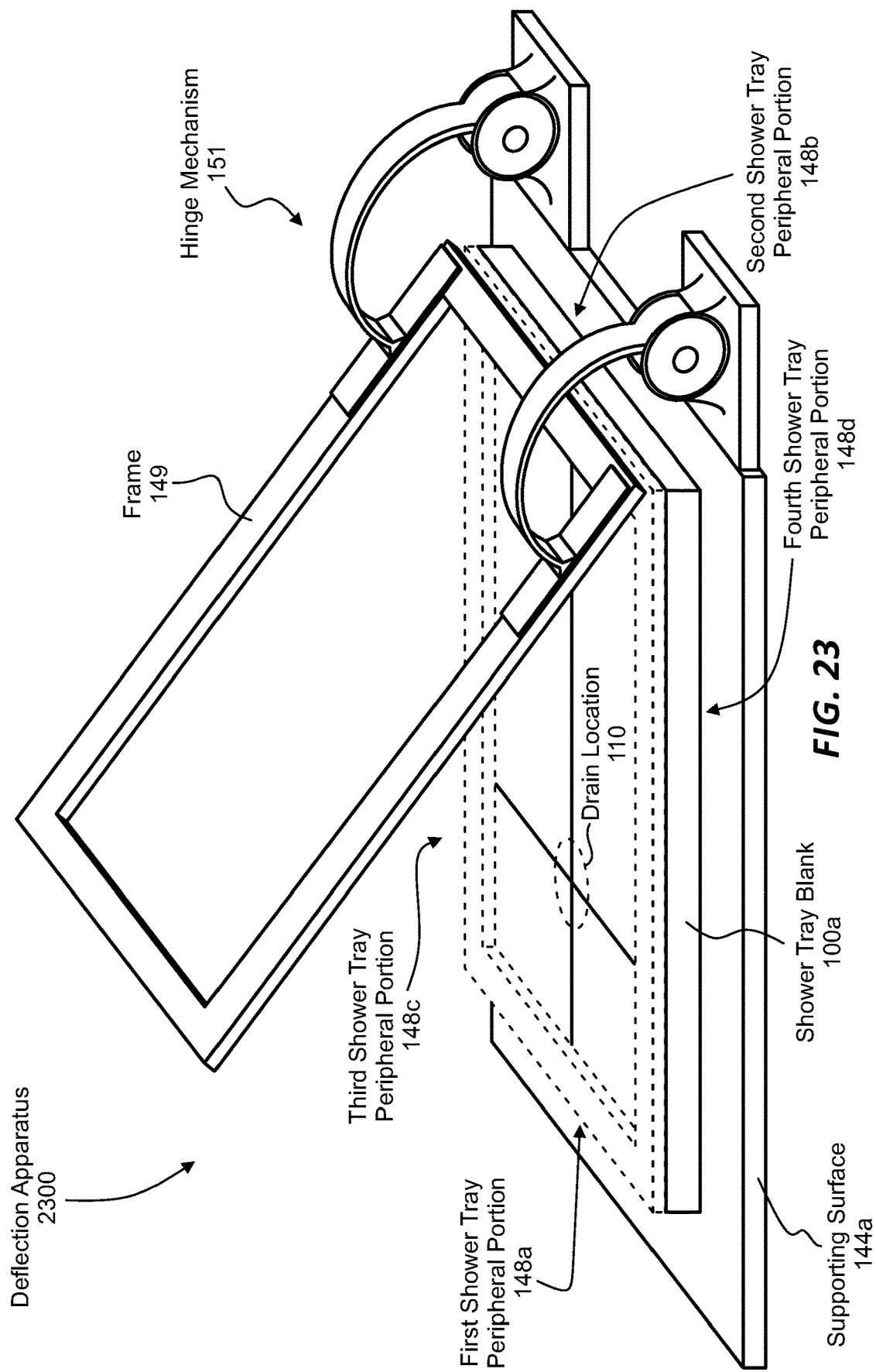
FIG. 23 illustrates one embodiment of a deflection mechanism.

FIG. 23 illustrates an alternative embodiment of a deflection apparatus 2300. The deflection apparatus 2300 may comprise a spacer 146 positioned between the supporting surface 144a and the shower tray blank 100a at the drain location 110. For simplicity, however, the spacer 146 is not shown in FIG. 23. The deflection apparatus 2300 comprises a frame 149 for applying a force to shower tray peripheral portions 148a-d of the shower tray blank 100a. The frame 149 is coupled to a hinge mechanism 151, which allows pivoting of the frame 149 and positioning of the frame 149 on the shower tray peripheral portions 148a-d of the shower tray blank 100a. The frame 149 is illustrated in phantom lines positioned on the shower tray peripheral portions 148a-d of the shower tray blank 100a in FIG. 23. A force applying mechanism, such as a set of clamps or weights 150a-d may be utilized to cause the frame 149 to apply a deflecting force to the shower tray blank 100a prior to cutting the shower tray blank 100a along a plane 152. For simplicity, neither clamps nor weights 150a-d are illustrated in FIG. 23. In one embodiment, the frame 149 is removably attachable to the hinge mechanism 151 to allow frames 149 of different sizes to be employed in the deflection apparatus 2300 to accommodate shower tray blank 100a of different sizes.

Figure 24:
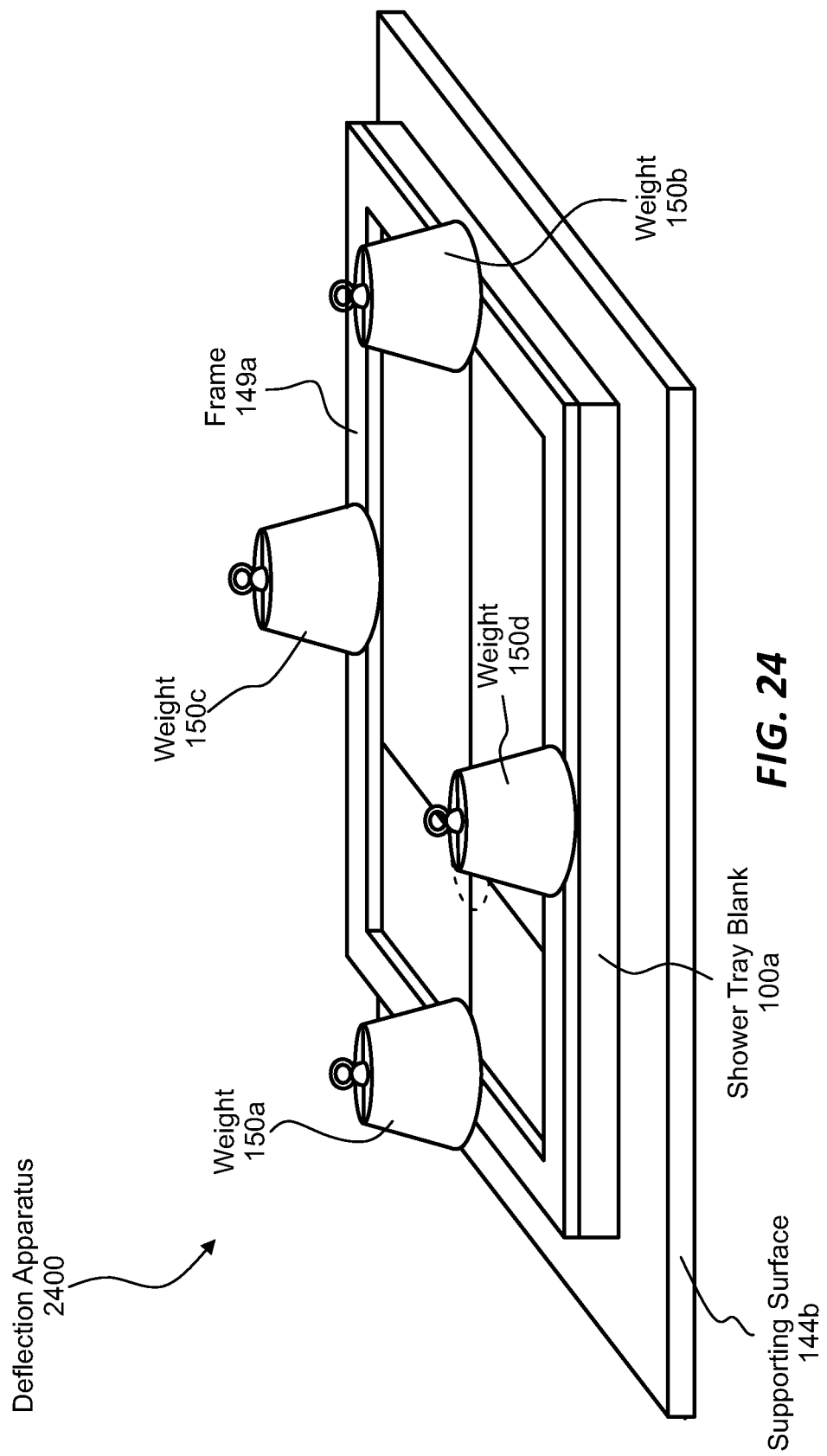
FIG. 24 illustrates another embodiment of a deflection mechanism.

FIG. 24 illustrates yet another alternative embodiment of a deflection apparatus 2400. In the illustrated embodiment, a frame 149a is positioned on top of the shower tray blank 100a. The spacer 146 intermediate the shower tray blank in the supporting surface 144b at the drain location 110 may be used in connection with this apparatus 2400; however, for simplicity, the spacer 146 is not illustrated. Weights 150a-d are positioned on the frame 149a to apply a deflecting force to the shower tray blank 100a. In an alternative embodiment, clamps or other force applying mechanisms may be used to draw the frame 149a toward the supporting surface 144b and apply a deflecting force to the shower tray blank 100a. In one embodiment, the deflection apparatus 400 comprises a number of different frames 149a (not illustrated) of different sizes to accommodate shower tray blanks 100a of different sizes.

Figure 25:
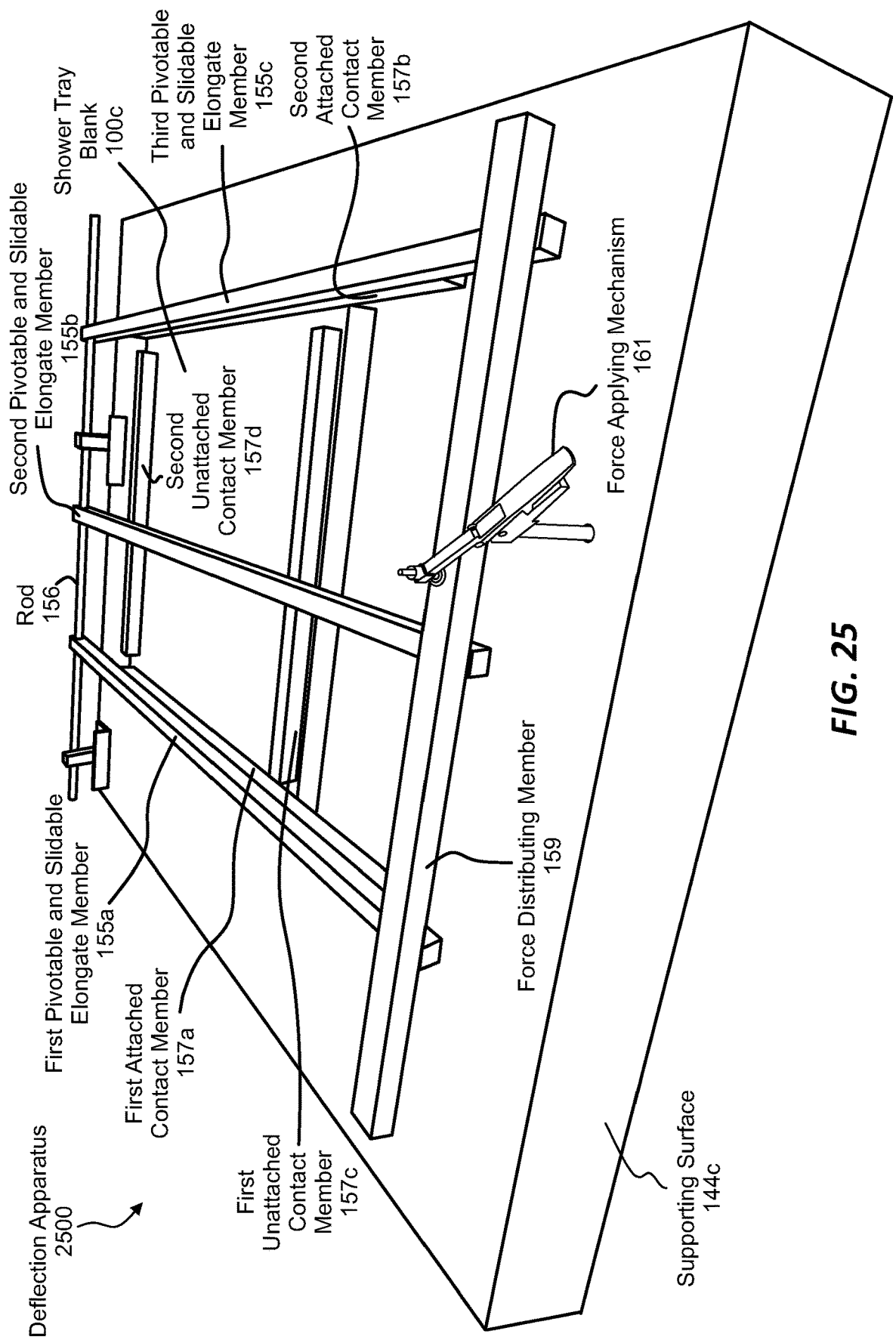
FIG. 25 illustrates another embodiment of a deflection mechanism.

FIG. 25 illustrates another embodiment of a deflection apparatus 2500. In the deflection apparatus 2500 illustrated in FIG. 25, a spacer 146 may be positioned intermediate the supporting surface 144c and the shower tray blank 100c. For simplicity, however, the spacer 146 is not illustrated in FIG. 25. The deflection apparatus 2500 illustrated in FIG. 25 includes a rod 156 that serves as a point of rotation (i.e., a "hinge" for a plurality of pivotable and slidable elongate members 155a-c. The elongate members 155a-d may pivot with respect to the rod 156. In addition, the elongate members 155a-d may slide along the length of the rod 156 to accommodate shower tray blanks 100c of different sizes. The deflection apparatus 2500 may also comprise a series of contact members 157a-d. The contact members 157a-d may be positioned on shower tray peripheral portions 148a-d of the shower tray blank 100c. (For simplicity, the shower tray peripheral portions 148a-d are not labeled in FIG. 25, but are labeled in earlier figures, such as FIG. 23.) The contact members 157a-d may include attached contact members 157a-b or unattached contact members 157c-d. In the illustrated embodiment, the attached contact members 157a-b are fixedly attached to pertinent elongate members 155a, 155c. The unattached contact members 157c-d are not attached to any of the elongate members 155a-c and, as such, may be repositioned on the peripheral portions 148a-b of the shower tray blank 100c to accommodate shower tray blanks 100c of different sizes. In alternative embodiments, one or more of the contact members 157a-d may be repositionally attached (e.g., slidably and/or pivotally attached) to the elongate members 155a-c to accommodate shower tray blanks 100c of different sizes. The apparatus 2500 may also include a force distributing member 159 to distribute an applied force to the pivotable and slidable elongate members 155a-c. The force distributing member 159 may be unattached to the elongate members 155a-c or, alternatively, may be slidably attached to the pivotable and slidable elongate members 155a-c. A force applying mechanism 161, such as a clamp 161 (which is illustrated in FIG. 25) or weights 150a-d (illustrated in earlier figures), may be utilized to apply a force to the elongate members 155a-c (indirectly by the force distributing member 159, as illustrated in FIG. 25, or directly to the elongate members 155a-c, for example, using the plurality of clamps 161 or weights 150a-d) to cause deflection of the shower tray blank 100c. The position of the rod 156 may be adjustable along a depth dimension 119a (illustrated in connection with prior figures) of the shower tray blank 100c to accommodate shower tray blanks 100c of different depths (D) 108. Alternatively, the depth of the contact members 157a-d and/or elongate members 155a-c may be altered (using different and interchangeable contact members 157a-d and/or elongate members 155a-c)

or shims may be employed in connection with the contact members 157*a-d* and/or elongate members 155*a-c* to increase a depth of the contact members 157*a-d* and/or elongate members 155*a-c*.

It should be noted that deflection apparatuses 2300, 2400, 2500 of FIGS. 23-25 may be used with various cutting mechanisms, such as the hot wire cutter 137, illustrated, for example, in FIG. 3, to cut the shower tray blank 100*a-c* when the blank 100*a-c* is in a deflected state.

Figure 26:
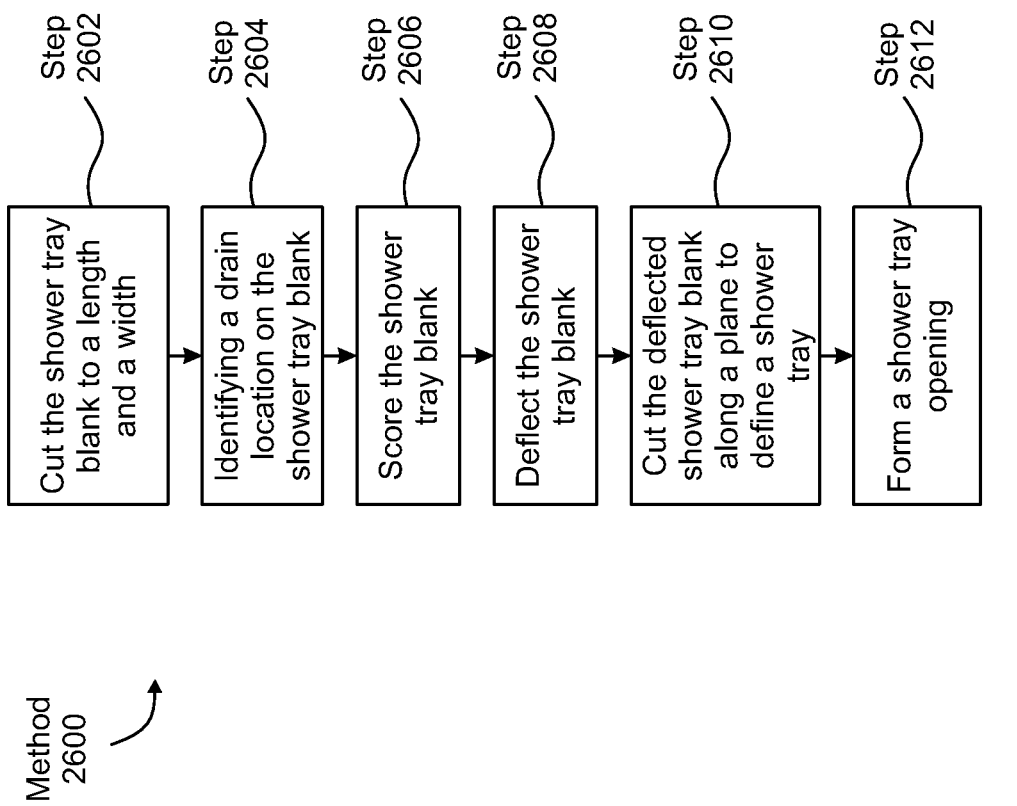
FIG. 26 is a flow diagram illustrating an embodiment of a method for producing a shower tray.

FIG. 26 is a flow diagram illustrating an embodiment of a method 2600 for producing a shower tray 100. It should be noted that various embodiments of the disclosed subject matter include all or only some of the steps recited in FIG. 26. In some embodiments, the shower tray 100 (and the shower tray blank 100*a-c*) may be formed from a polystyrene foam material. For example, the shower tray 100 may be formed from 3 lb high-density polystyrene.

In step 2602, the shower tray blank 100*a-c* is cut to a length 104 and a width 106 corresponding to determined shower length and width, as explained, for example, in connection with FIGS. 2-3.

In step 2604, a drain location 110 on the shower tray blank 100*a-c* corresponding to a determined drain location is identified. This may be achieved, for example, employing measurements described in the diagrams 168*a-b* of FIGS. 17A-B.

In step 2606, the shower tray blank 100*a-c* may optionally be scored with one or more score cuts 122*a-b* on the second large surface 138 to a given depth (C1) 140. The plurality of score cuts 122*a-b* may be centered at, and/or pass through a drain location 110 on the shower tray blank 100*a-c*. In some embodiments, scoring the shower tray 100 may include scoring the shower tray blank 100*a-c* with a first score cut 122*a* extends generally along a width dimension 120*a* of the shower tray blank 100*a-c* and centered at, and/or passing through the drain location 110. The shower tray 100 may also be scored with a second score cut 122*b* generally along a length dimension 118*a* and centered at, and/or passing through the drain location 110. In some embodiments, the score cuts 122*a-b* may be made with a hot wire cutter 137. In one embodiment, no score cuts 122*a-b* are included. Also, it should be noted that the score cuts 122*a-b* may be performed with other mechanisms, such as a saw or laser cutter. Scoring is illustrated and discussed, for example, in connection with FIGS. 4-6.

In step 2608, the shower tray blank 100*a-c* may be deflected at a drain location relative to a shower tray perimeter 145*a-d* of the shower tray blank 100*a-c* along the depth dimension 119*a* to a deflected state. The deflection may be centered at the drain location 110. The shower tray 100 may be deflected a certain distance (e.g., the spacer depth 154) to achieve a slope on a contoured surface 124 of the shower tray 100 based on building codes. Deflection of the shower tray blank is illustrated and explained, for example, in connection with FIGS. 8-9, FIGS. 18-19, and FIGS. 23-25.

Deflecting the shower tray blank 100*a-c* may include bending the shower tray blank 100*a-c* such that the score cuts 122*a-b* open when in a deflected state. In various embodiments, deflecting the shower tray blank 100*a-c* may include placing a spacer 146 located at the drain location 110 between the first large surface 102 and a supporting surface 144. The spacer 146 may have a spacer depth 154 to achieve the desired slope of the contoured surface 124. Weights 150*a-d* may be placed at locations on the second large surface 138 to cause the perimeter edges 145*a-d* of the first large surface 102 to contact or at least deflect toward the supporting surface 144.

In other embodiments, a spacer 147 may be placed between the second large surface 138 and the supporting surface 144. The spacer 147 may be positioned along the peripheral portions 148*a-d* of the shower tray blank 109*a* intermediate the second large surface 138 and the supporting surface 144. The spacer 147 may have a spacer depth 154 to achieve the desired slope of the contoured surface 124. A weight 150 may be placed on the first large surface 102 (now oriented away from the supporting surface 144) at the drain location 110 to cause the second large surface 138 to contact or deflect toward the supporting surface 144.

In step 2610, the deflected shower tray 100 may be cut along a plane 152 offset from the first large surface 102 by a depth (D) 108 along the perimeter edges 145*a-d* to form the contoured surface 124. The contoured surface 124 of the shower tray 100 may be opposite the first large surface 102 when the shower tray 100 is in an undeflected state. The plane 152 may be generally parallel to the supporting surface 144. In some embodiments, the cut is made with a hot wire cutter 137, although other types of cutting mechanisms may be employed.

After forming the contoured surface 124, the perimeter edges of the shower tray 100 may have substantially uniform depth (D) 108. The contoured surface 124 slopes down from the perimeter edges to the drain location 110. A discarded portion 153 may be removed after forming the contoured surface 124. In various embodiments, the shower tray 100 may be of non-uniform depth (D) 108 along the shower tray perimeter 145*a-d*. Step 2610 is described, for example, in connection with FIGS. 10-11 and 20-21.

In step 2612, a drain opening 164 may be formed in the shower tray 100 at the drain location 110. For example, an outline 162 of a drain flange 160 may be traced onto the shower tray 100 at the drain location 110. A drain opening 164 may then be cut into the shower tray 100. Step 2612 is described, for example, in connection with FIGS. 13-14.

It is understood that any specific order or hierarchy of steps in any disclosed process is one embodiment of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed.

What is claimed is:

1. A method for producing a shower tray from a shower tray blank, the shower tray blank having a first large surface and a second large surface opposite the first large surface, the shower tray blank having a length dimension, a width dimension, and a depth dimension, the length dimension, the width dimension and the depth dimension each being mutually perpendicular, the depth dimension being generally perpendicular to the first large surface, the shower tray blank having a depth from the first large surface to the second large surface along the depth dimension, the method comprising:
   identifying a drain location on the shower tray blank;
   scoring the shower tray blank with one or more score cuts through the first large surface or the second large surface to a depth less than the depth, the one or more score cuts passing through the drain location;
   deflecting the shower tray blank at the drain location relative to a shower tray perimeter of the shower tray blank along the depth dimension to a deflected state;
   cutting the shower tray blank along a plane generally perpendicular to the depth dimension when the shower tray blank is in the deflected state to form the shower tray and a discarded portion, the shower tray comprising either the first large surface or the second large surface and a contoured surface formed by the cut along the plane; and
   forming a drain opening in the shower tray at the drain location.

2. The method of claim 1, wherein scoring the shower tray blank comprises:
   scoring the shower tray blank with a first score cut generally along the length dimension of the shower tray blank and passing through the drain location; and
   scoring the shower tray blank with a second score cut generally along the width dimension and passing through the drain location.

3. The method of claim 2, wherein deflecting the shower tray blank comprises deflecting the shower tray blank at the drain location a certain distance along the depth dimension to achieve a desired slope of the contoured surface.

4. The method of claim 3, wherein deflecting the shower tray blank comprises bending the shower tray blank such that the score cuts open when the shower tray blank is in the deflected state.

5. The method of claim 1, wherein deflecting the shower tray blank comprises:
   placing a spacer located at the drain location between the first large surface and a supporting surface, the spacer having a spacer depth to achieve a desired slope of the contoured surface; and
   applying a force at locations on the second large surface to cause perimeter edges of the first large surface to contact or deflect toward the supporting surface.

6. The method of claim 5, wherein cutting the shower tray blank when the shower tray blank is in the deflected state along the plane comprises:
   cutting through the entire deflected shower tray blank along the plane generally perpendicular to the depth dimension, the plane being generally parallel to the supporting surface.

7. The method of claim 1, wherein deflecting the shower tray blank comprises:
   placing a spacer between the second large surface of the shower tray blank and a supporting surface, the spacer positioned along peripheral portions of the second large surface, the spacer having a spacer depth to achieve a desired slope of the contoured surface; and
   applying a force on the first large surface at the drain location to cause the second large surface to contact or deflect toward the supporting surface.

8. The method of claim 1, wherein after forming the contoured surface, perimeter edges of the shower tray have a substantially uniform depth, and wherein, the contoured surface slopes down from the perimeter edges to the drain location when the shower tray is in an installed state.

9. The method of claim 1, wherein the shower tray blank comprises a polystyrene foam material.

10. The method of claim 1, wherein the score cuts and the cut along the plane are made with a hot wire cutter.

11. A method for producing a shower tray from a shower tray blank, the shower tray blank having a first large surface and a second large surface opposite the first large surface, the shower tray blank having a length dimension, a width dimension, and a depth dimension, the length dimension, the width dimension and the depth dimension each being mutually perpendicular, the depth dimension being generally perpendicular to the first large surface, the shower tray blank having a depth from the first large surface to the second large surface along the depth dimension, the method comprising:
   cutting the shower tray blank to a length and a width corresponding to a determined shower length and width;
   identifying a drain location on the shower tray blank corresponding to a determined shower drain location;
   scoring the shower tray blank with one or more score cuts through the second large surface or the first large surface to a depth less than the depth, the one or more score cuts passing through the drain location;
   deflecting the shower tray blank at the drain location relative to a shower tray perimeter of the shower tray blank along the depth dimension to a deflected state;
   cutting the shower tray blank along a plane generally perpendicular to the depth dimension when the shower tray blank is in the deflected state to form the shower tray and a discarded portion, the shower tray comprising either the first large surface or the second large surface and a contoured surface formed by the cut along the plane; and
   forming a drain opening in the shower tray at the drain location.

12. The method of claim 11, wherein scoring the shower tray blank comprises:
   scoring the shower tray blank with a first score cut generally along the length dimension of the shower tray blank and passing through the drain location; and
   scoring the shower tray blank with a second score cut generally along the width dimension and passing through the drain location.

13. The method of claim 12, wherein deflecting the shower tray blank comprises deflecting the shower tray blank at the drain location a certain distance along the depth dimension to achieve a desired slope of the contoured surface.

14. The method of claim 13, wherein deflecting the shower tray blank comprises:
   placing a spacer located at the drain location between the first large surface and a supporting surface, the spacer having a spacer depth to achieve the desired slope of the contoured surface; and
   applying a force at locations on the second large surface to cause perimeter edges of the first large surface to contact or deflect toward the supporting surface.

15. The method of claim 14, wherein cutting the shower tray blank when the shower tray blank is in the deflected state along the plane comprises:
   cutting through the entire deflected shower tray blank along the plane, the plane being generally parallel to the supporting surface.

16. A method for producing a shower tray from a shower tray blank, the shower tray blank having a first large surface and a second large surface opposite the first large surface, the shower tray blank having a length dimension, a width dimension, and a depth dimension, the length dimension, the width dimension and the depth dimension each being mutually perpendicular, the depth dimension being generally perpendicular to the first large surface, the shower tray blank having a depth from the first large surface to the second large surface along the depth dimension, the method comprising:

deflecting the shower tray blank at an internal location relative to a shower tray perimeter of the shower tray blank along the depth dimension to a deflected state, wherein the internal location is offset relative to the shower tray perimeter along the depth dimension and the width dimension; and cutting the shower tray blank along a plane generally perpendicular to the depth dimension when the shower tray blank is in the deflected state to form the shower tray and a discarded portion, wherein the cut extends along an entirety of either the length dimension or the width dimension of the shower tray blank such that the shower tray comprises either the first large surface or the second large surface and a contoured surface formed by the cut along the plane.

17. The method of claim 16, further comprising:

scoring the shower tray blank with a first score cut generally along the length dimension of the shower tray blank and passing through a drain location; and scoring the shower tray blank with a second score cut generally along the width dimension and passing through the drain location.

18. The method of claim 17, wherein deflecting the shower tray blank at the internal location comprises deflecting the shower tray blank at the drain location a certain distance along the depth dimension to achieve a desired slope of the contoured surface.

19. The method of claim 18, wherein deflecting the shower tray blank comprises:

placing a spacer located at the drain location between the first large surface and a supporting surface, the spacer having a spacer depth to achieve the desired slope of the contoured surface; and applying a force at locations on the second large surface to cause perimeter edges of the first large surface to contact or deflect toward the supporting surface.

20. An apparatus for producing a shower tray from a shower tray blank, the shower tray blank having a first large surface and a second large surface opposite the first large surface, the shower tray blank having a length dimension, a width dimension, and a depth dimension, the length dimension, the width dimension and the depth dimension each being mutually perpendicular, the depth dimension being generally perpendicular to the first large surface, the shower tray blank having a depth from the first large surface to the second large surface along the depth dimension, the apparatus comprising:

a deflection apparatus for deflecting the shower tray blank at an internal location relative to a shower tray perimeter of the shower tray blank along the depth dimension to a deflected state; and a cutting apparatus for cutting the shower tray blank along a plane generally perpendicular to the depth dimension of the shower tray blank when the shower tray blank is in the deflected state to form the shower tray and a discarded portion, wherein the cut extends along an entirety of either the length dimension or the width dimension of the shower tray blank such that the shower tray comprises either the first large surface or the second large surface and a contoured surface formed by the cut along the plane.

\* \* \* \* \*